(12) United States Patent
Nakarmi et al.

(10) Patent No.: US 12,512,671 B1
(45) Date of Patent: Dec. 30, 2025

(54) SYSTEM AND METHOD FOR INFERRING PHOTOVOLTAIC SYSTEM SPECIFICATIONS WITH THE AID OF A DIGITAL COMPUTER

(71) Applicant: Clean Power Research, L.L.C., Napa, CA (US)

(72) Inventors: Upama Nakarmi, Fremont, CA (US); Thomas E. Hoff, Napa, CA (US)

(73) Assignee: CLEAN POWER RESEARCH, L.L.C., Napa, CA (US)

( * ) Notice: Subject to any disclaimer, the term of this patent is extended or adjusted under 35 U.S.C. 154(b) by 390 days.

(21) Appl. No.: 18/328,462

(22) Filed: Jun. 2, 2023

Related U.S. Application Data

(60) Provisional application No. 63/348,454, filed on Jun. 2, 2022.

(51) Int. Cl.
| | | |
|---|---|---|
| *H02J 3/00* | (2006.01) | |
| *G01J 1/42* | (2006.01) | |
| *G01W 1/10* | (2006.01) | |
| *G01W 1/18* | (2006.01) | |
| *H02S 50/10* | (2014.01) | |

(52) U.S. Cl.
CPC ............... *H02J 3/004* (2020.01); *G01J 1/42* (2013.01); *G01W 1/10* (2013.01); *G01W 1/18* (2013.01); *H02J 3/003* (2020.01); *H02S 50/10* (2014.12); *G01J 2001/4285* (2013.01); *H02J 2203/10* (2020.01); *H02J 2203/20* (2020.01); *H02J 2300/24* (2020.01)

(58) Field of Classification Search
CPC ...... H02J 3/00; H02J 2300/24; H02J 2203/20; H02J 2203/10; H02S 50/10; G01J 1/42; G01J 2001/4285; G01W 1/10; G01W 1/18

USPC ........................................................ 700/286
See application file for complete search history.

(56) References Cited

U.S. PATENT DOCUMENTS

| | | | | |
|---|---|---|---|---|
| 10,140,401 | B1* | 11/2018 | Hoff .................. | G01W 1/12 |
| 10,409,925 | B1* | 9/2019 | Hoff .................. | H02S 50/00 |
| 10,797,639 | B1* | 10/2020 | Hoff .................. | G01W 1/10 |
| 10,958,211 | B1* | 3/2021 | Sarwat ............... | H02J 3/004 |
| 11,423,199 | B1* | 8/2022 | Hoff .................. | G06F 30/13 |
| 2011/0276269 | A1* | 11/2011 | Hummel ............. | G01W 1/10 |
| | | | | 702/3 |

(Continued)

*Primary Examiner* — Md Azad
(74) *Attorney, Agent, or Firm* — Leonid Kisselev

(57) ABSTRACT

A system and method for inferring photovoltaic (PV) system specifications are described. A consumer PV system's location and net load data recorded through net metering are retrieved. For each discrete period, a time of peak PV production and a magnitude of minimum net load for a representative day are found, and base loads are estimated. Plane-of-array irradiance (POAI) using clear sky global horizontal irradiance for azimuth and tilt combinations is produced. Azimuth, tilt, and system rating combinations based on the magnitude of minimum net load and the base load over each discrete period are created. A lowest error metric among the azimuth, tilt and system rating combinations is found, by finding the minimum of the combined residual errors in the time of peak PV production and the time of maximum POAI and residual errors in the magnitude of minimum net load plus the base load and magnitude of maximum POAI.

21 Claims, 16 Drawing Sheets
(6 of 16 Drawing Sheet(s) Filed in Color)

(56) References Cited

U.S. PATENT DOCUMENTS

2015/0372641 A1\* 12/2015 Webber .................. H02S 10/00
703/2

\* cited by examiner

```
       ( Cloudy and Overcast )
                  │
                  ▼
   ╱ For each clear sky day, Do ╲ ～ 61
                  │
                  ▼
   ┌─────────────────────────────┐
   │ Reuse straight-line equation│ ～ 62
   │ between two first derivatives│
   └─────────────────────────────┘
                  │
   ┌ ─ ─ ─ ─ ─ ─ ─▼─ ─ ─ ─ ─ ─ ─ ┐
   │         Slope Test           │ ～ 63
   │  ┌────────────────────────┐  │
   │  │  Calculate slope       │ ～ 64
   │  │  of the straight line  │  │
   │  └────────────────────────┘  │
   │            │                 │
   │            ▼                 │
   │  ┌────────────────────────┐  │
   │  │ Estimate median slope of each │ ～ 65
   │  │ month throughout year  │  │
   │  └────────────────────────┘  │
   │            │                 │
   │            ▼                 │
   │  ┌────────────────────────┐  │
   │  │ Remove those days whose│  │
   │  │ slope of the straight-line │
   │  │ equation exceeds the median │ ～ 66
   │  │ slope of each month from the │
   │  │ set of clear sky days  │  │
   │  └────────────────────────┘  │
   └ ─ ─ ─ ─ ─ ─ ─│─ ─ ─ ─ ─ ─ ─ ┘
                  ▼
       ╱ End Do              ╲ ～ 67
       ╱ /* Next clear sky day */╲
                  │
                  ▼
                ( A )
```

Fig. 6 (con'd).

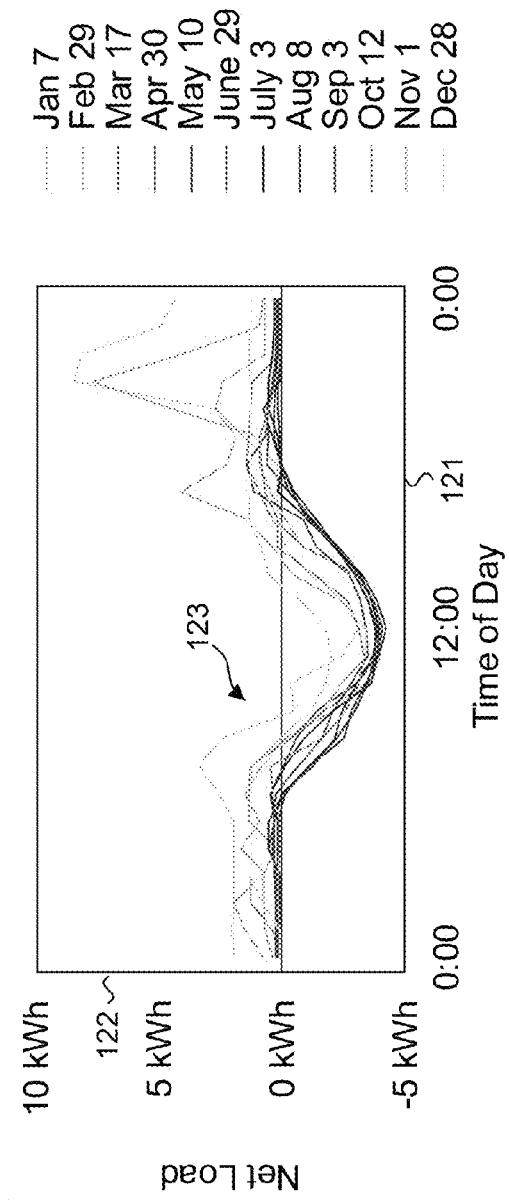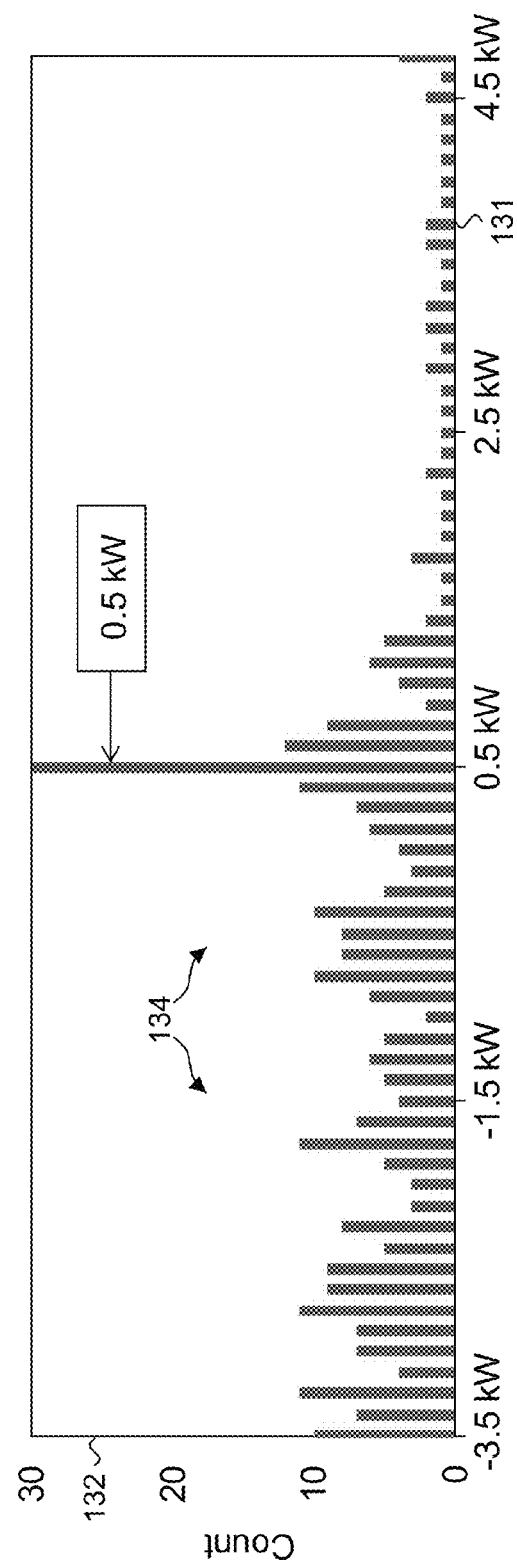
Fig. 11. 120
Fig. 12. 130 a) March 22, 2016
b) June 22, 2016
c) September 22, 2016
d) December 22, 2016

SYSTEM AND METHOD FOR INFERRING PHOTOVOLTAIC SYSTEM SPECIFICATIONS WITH THE AID OF A DIGITAL COMPUTER

CROSS-REFERENCE TO RELATED APPLICATION

This patent application claims priority under 35 U.S.C. § 119 (e) to U.S. Provisional Patent Application, Ser. No. 63/348,454, filed Jun. 2, 2022, the disclosure of which is incorporated by reference.

FIELD

This invention relates in general, to photovoltaic systems and in particular, to a system and method for inferring photovoltaic system specifications with the aid of a digital computer.

BACKGROUND

Photovoltaic (PV) system adoption continues to grow throughout the United States and abroad as consumers seek sustainable and cost-effective solutions to offset their reliance on utility-provided power. Increasingly, residential consumers are installing PV systems to reduce or eliminate electricity purchased from utilities. This shift away from utility power is gaining momentum. Per U.S. Energy Information Administration (EIA) data, in 2021, residential PV systems accounted for 61% of total annual electricity generation from small scale distributed PV systems and their share is expected to continue to increase each year.

A PV system generates electricity through an array of PV panels or modules coupled to an inverter that converts direct current to alternating current for household use, plus, optionally, batteries to store electricity from the solar panels. The majority of grid-connected residential PV systems are "behind the meter" (BTM) systems operating on a residence with just a single net energy metering (NEM) power meter installed. An NEM meter will run forward at any point during the day while electricity is being supplied to the customer by the utility and the meter will run backwards at any point during the day when excess PV production generated by the customer's PV system is back-fed to the power distribution grid.

Electric utilities require visibility into the PV installations within their territories. Residential PV systems pose a challenge to utilities because the cumulative power output of these PV systems can affect the demand made on a power distribution grid. Electric utilities must be able to accurately forecast expected energy load to be able to provide sufficient electricity to meet actual on-going grid-wide demand. Load forecasting is a central part of the scheduling of electricity generation and procurement and to the overall management of a power system; the accuracy of load forecasting directly effects the planning, operational and managerial loading of a utility, PV fleet and distribution grid.

Inaccuracies in load forecasting can have a cascading effect. Electricity provided over a power distribution grid is consumed instantaneously by consumers. Demand may exceed the electricity available to a utility and, as a result, a utility may be required to reach out to other energy producers on the distribution grid to make up for the energy deficit imposed by their consumers. As a result, utilities strive to avoid or prevent drastic unexpected changes in demand, during which a utility may need to rapidly procure additional energy to meet unanticipated demand by tapping into energy produced elsewhere on the grid, thereby exacerbating the situation by upsetting the load forecasts of other energy producers connected to the power grid.

Load forecasting includes accurately determining what percentage of demand can be met by residential PV production. Thus, utilities need to know the total PV production expected to be generated by the residential PV systems under their service over a forecast period. Existing NEM metering only provides net load data combining the electricity supplied by the utility with excess PV production back-fed to the grid; a second meter is required to measure actual total PV production. Although two meters would respectively provide a utility with accurate readings of net consumed electricity and total PV-produced electricity, adding and maintaining a second meter significantly adds to a utility's overall expenses and operational maintenance loads. Moreover, the availability of total PV production data is tied to the reliability of the second meter. If the second meter malfunctions or fails, the utility would need to adjust the PV production data used in the load forecast, assuming that the meter problem was timely identified. Therefore, dual meter installation is impracticable for reasons of cost, operations, and data reliance.

Alternatively, rather than installing a second meter to measure actual PV production, utilities can estimate total expected residential PV production using data already available to them. The theoretical energy production of a PV system is a function of the PV system's location and specifications, and many utilities have enacted rules that require interconnection permits, during which they collect PV system information, such as azimuth, tilt, and PV system size (or rating). As used herein, system size and system rating are synonymous and are used interchangeably with no distinction in meaning implied or intended. In addition, solar irradiance data is widely available to utilities from reliable sources, such as through the SolarAnywhere® service, offered by Clean Power Research, L.L.C., Napa, CA. System orientation, including azimuth and tilt, are fundamental inputs to transposition models that generate plane of array irradiance (POAI) from global horizontal and direct normal irradiance, the latter components of which can be obtained from a solar irradiance data provider. Utilities can use the POAI with available residential system specifications as inputs to energy models to simulate expected total residential PV system production for use in load forecasting.

Utilities cannot always safely rely on system specifications provided by consumers or system installers, which can vary in terms of completeness, quality, and correctness. Moreover, system specifications may sometimes simply not be available, as can happen with privately-owned PV systems. Furthermore, although the specifications are intended to reflect the actual installed PV system, user-supplied specifications may be incorrect, for instance, manufacturing tolerances may vary from design specifications and can lead to differences in actual PV production. As well, PV system specifications change over time due to physical factors affecting the system, such as faulty or inefficient power inverters, dirt or soiling of array panels, or shading caused by construction, trees, or other obstructions. Consequently, PV production forecasts generated by a utility based on consumer-reported specifications must include a sufficient margin of error, which in turn can introduce a degree of possibly unacceptable uncertainty into a load forecast.

Therefore, a need remains for a reliable approach to accurately determining PV system specifications using trustworthy information that is widely available to utilities and upon which utilities can depend with a high degree of certainty in estimating expected total consumer PV production and in generating energy load forecasts.

SUMMARY

To avoid incorporating inaccurate or incomplete system specifications into a load forecast calculation, consumer PV system specifications are first inferred based only on trustworthy information, PV system location and net load data as measured by an NEM meter or similar device. System specifications, such as azimuth, tilt and PV system size (or rating) are inferred, and these system specifications can be used to estimate total PV production. Other system specifications may also be inferred.

One embodiment provides a method for inferring photovoltaic (PV) system specifications with the aid of a digital computer. A location of a consumer site at which a PV system has been installed and connected to a power grid operated by a utility, and net load data recorded through net metering of the consumer site by the utility are retrieved. A time frame under consideration into discrete periods is divided. For each of the discrete periods, a time of peak PV production for the location and a magnitude of minimum net load for the PV system for a representative day are found, and a set of base loads for the consumer site is estimated. Each estimated base load represents a minimal amount of energy consumed. Plane-of-array irradiance (POAI) using clear sky global horizontal irradiance (GHI) for the location for a plurality of azimuth and tilt combinations for the PV system for each of the representative days is produced. System specifications for the PV system are inferred. A set of azimuth, tilt, and system rating combinations for the PV system based on the magnitude of minimum net load and the base load over each discrete period are created. A lowest error metric among the set of azimuth, tilt, and system rating combinations is found, including minimizing combined residual errors in the time of peak PV production and a maximum of the POAI and residual errors in the magnitude of minimum net load plus the base load and a maximum of the POAI. The inferred system specifications are the azimuth, tilt, and system rating combination associated with the lowest error metric. The power grid is operated by the utility based on total PV power production of the PV system as simulated using the inferred system specifications over the time frame.

A further embodiment provides a system for inferring photovoltaic (PV) system specifications with the aid of a digital computer. A database stores the location of a consumer site at which a PV system has been installed and connected to a power grid operated by a utility, and net load data recorded through net metering of the consumer site by the utility. A computer is interfaced to the database and includes a processor coupled to a memory and executing program instructions maintained in the memory. The program instructions includes code operable to perform the steps of dividing a time frame under consideration into discrete periods and, for each of the discrete periods, performing the steps: finding a time of peak PV production for the location and a magnitude of minimum net load for the PV system for a representative day; and estimating a set of base loads for the consumer site, each estimated base load representing a minimal amount of energy consumed; producing plane-of-array irradiance (POAI) using clear sky global horizontal irradiance (GHI) for the location for a plurality of azimuth and tilt combinations for the PV system for each of the representative days; and inferring system specifications for the PV system, including performing the steps of: creating a set of azimuth, tilt, and system rating combinations for the PV system based on the magnitude of minimum net load and the base load over each discrete period; and finding a lowest error metric among the set of azimuth, tilt, and system rating combinations including minimizing combined residual errors in the time of peak PV production and a maximum of the POAI and residual errors in the magnitude of minimum net load plus the base load and a maximum of the POAI, the inferred system specifications include the azimuth, tilt, and system rating combination associated with the lowest error metric, wherein the power grid is operated by the utility based on total PV power production of the PV system as simulated using the inferred system specifications over the time frame.

In a still further embodiment, the accuracy of the inferred PV system specifications can be tested using real world PV production data. A best match is made between proxy PV production data based on net load for clear sky days and ground truth data derived from plane of array irradiance (POAI).

By virtue of being based wholly on trustworthy data originating with and known to a utility, the PV system specifications thus inferred can be considered reliable, thereby minimizing, or even eliminating the need to build a degree of possibly unacceptable uncertainty into a load forecast.

Still other embodiments will become readily apparent to those skilled in the art from the following detailed description, wherein are described embodiments by way of illustrating the best mode contemplated. As will be realized, other and different embodiments are possible and the embodiments' several details are capable of modifications in various obvious respects, all without departing from their spirit and the scope. Accordingly, the drawings and detailed description are to be regarded as illustrative in nature and not as restrictive.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 11 is a graph showing, by way of example, the net load profile of selected days in 2016 for a location in Napa, CA.

FIG. 12 is a graph showing, by way of example, the frequency distribution of various net loads for the location in Napa, CA in April 2016.

DETAILED DESCRIPTION

Overview

To accurately forecast expected demand, a utility needs to know the total PV production expected to be generated by the residential PV systems under their service over a forecast period needs. Total PV production data, though, is not available with NEM metering as separate PV production meters are generally not installed on homes, so utilities must instead estimate total PV production using available information as a substitute for inquiring "behind" its NEM meters. Although presented herein with reference to a private residence, the discussion is equally applicable to any consumer PV system installation at which a power utility measures net energy load through an NEM meter or similar form of net load power metering, whether residential, commercial, private, public, governmental, and so forth. This discussion is also applicable where two (or more) meters have been installed to measure net consumed electricity, total PV-produced electricity, or other data, although only the first value, net load, would be needed to estimate total PV production.

NEM meters only measure the net electricity load on a house. The net load reflects the combined effects of utility-provided consumed electricity and PV system-generated back-fed electricity; the only PV production seen by a utility is excess back-fed PV production. Consequently, absent the installation of a second meter to measure total PV system production, the utility must estimate total PV production at each residence based on whatever information may be available, which typically includes the location of each connected PV system and any associated consumer-provided system specifications. Notwithstanding, not all aspects of such system specifications can be reliably used.

Figure 1:
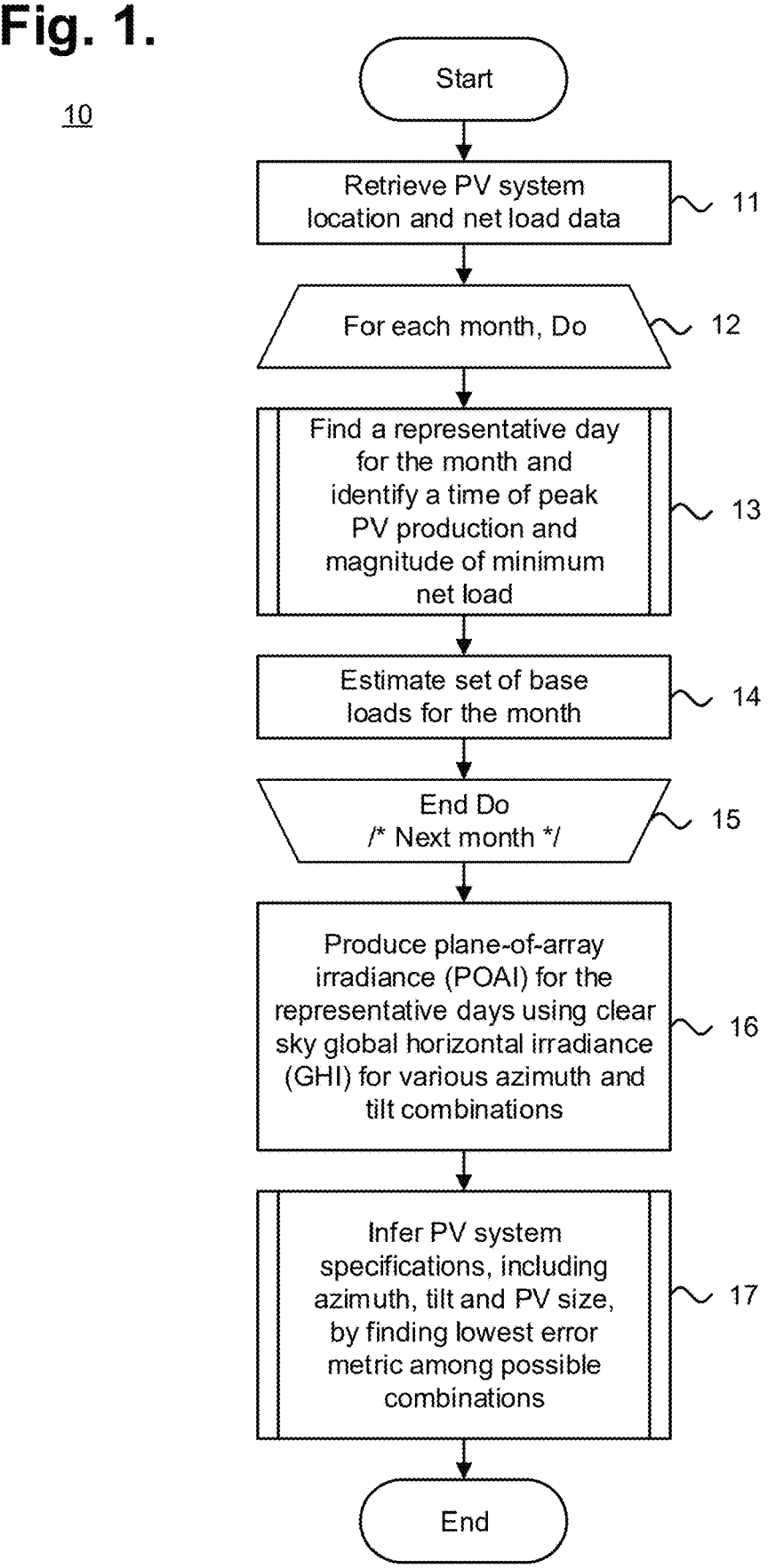
FIG. 1 is a flow diagram showing a method for inferring photovoltaic system specifications with the aid of a digital computer in accordance with one embodiment.

The most trustworthy data available to a utility is the location of each connected PV system and the net load data regularly recorded by and collected from its NEM meters. An approach to inferring reliable PV system specifications from this data will now be discussed, starting with an overview of the basic steps involved. FIG. 1 is a flow diagram showing a method 10 for inferring photovoltaic system specifications with the aid of a digital computer in accordance with one embodiment. The method 10 can be implemented in software and execution of the software can be performed on a computer system, such as described supra with reference to FIG. 20, as a series of process or method modules or steps.

Definitionally, for a residential site R that has a PV system P, assume net load $R_{net}(t)$ is combined with PV production $P(t)$ and gross energy consumption $R_{gross}(t)$, as shown in Equation (1):

$$R_{net}(t) = R_{gross}(t) - P(t) \quad (1)$$

where $R_{gross}(t) \geq 0$ and $P(t) \geq 0$ at any given time t.

Preliminarily, the location of the PV system and its net load data (step 11) are first retrieved. Generally, a utility identifies a PV system's location by latitude and longitude; however, other locational representations, such as GPS coordinates, could be used. The net load data is typically structured as a time series of measurements recorded by an NEM meter at regular intervals, such as hourly or daily, and are collected and stored by the utility for the PV system. Ordinarily, a utility stores the net load data by date; storing this data by date is meaningful, as PV production over the course of each day is tied to solar irradiance, which will rise, peak, and fall as the sun progresses through the sky from horizon to horizon. Still, other collection intervals in lieu of or in addition to storing net load data by date are possible.

PV system specifications are inferred by evaluating net load data over the time frame under consideration. Ideally, this time frame is selected by the utility to last at least one entire year, so as to account for seasonal differences in PV production that naturally occur as the sun's azimuth changes; preferably, several (whole) years' worth of data is considered. Once the time frame is selected, the time frame is divided into discrete periods of time, typically one month, and the following evaluative steps are solved for each month or discrete period (step 12):

1) Find a time of peak PV production for the location and identify a magnitude of minimum net load for the PV system (step 13), which can be found by the following sub-steps:
   a) Identify clear sky days using deviation test.
   b) Remove cloudy and overcast days using slope and overcast tests.
   c) Identify clear sky hours within the remaining clear sky days.
   d) Filter net load and cross reference with GHI clear sky days.

e) Extract a magnitude of minimum net load and a time-of-day of minimum net load (time of peak PV production) for one representative day per month.

2) Estimate base loads (step 14).

For clear sky days that have passed all of the aforementioned tests, time of peak PV production is synonymous with time-of-day of minimum net load and these two terms are used interchangeably throughout this document with no distinction in meaning implied or intended. The foregoing steps are repeated for each remaining month (step 15) during the time frame under consideration. Other discrete periods of time could be used instead of months, such as quarters, weeks, and so forth. Finally, the system specifications of the PV system P are inferred:

3) Produce plane-of-array irradiance (POAI) using clear sky global horizontal irradiance (GHI) for various azimuth and tilt combinations (step 16).

4) Identify array azimuth $P_{az}$, tilt $P_{tilt}$, and size $P_{size}$ (step 17), which constitute the system specifications of the PV system P.

System size $P_{size}$ is synonymous with system rating and is used interchangeably throughout this document with no distinction in meaning implied or intended. The detailed evaluative steps performed as part of the approach will now be described.

Step 1: Find Time of Peak Pv Production and Magnitude of Minimum Net Load

Figure 2:
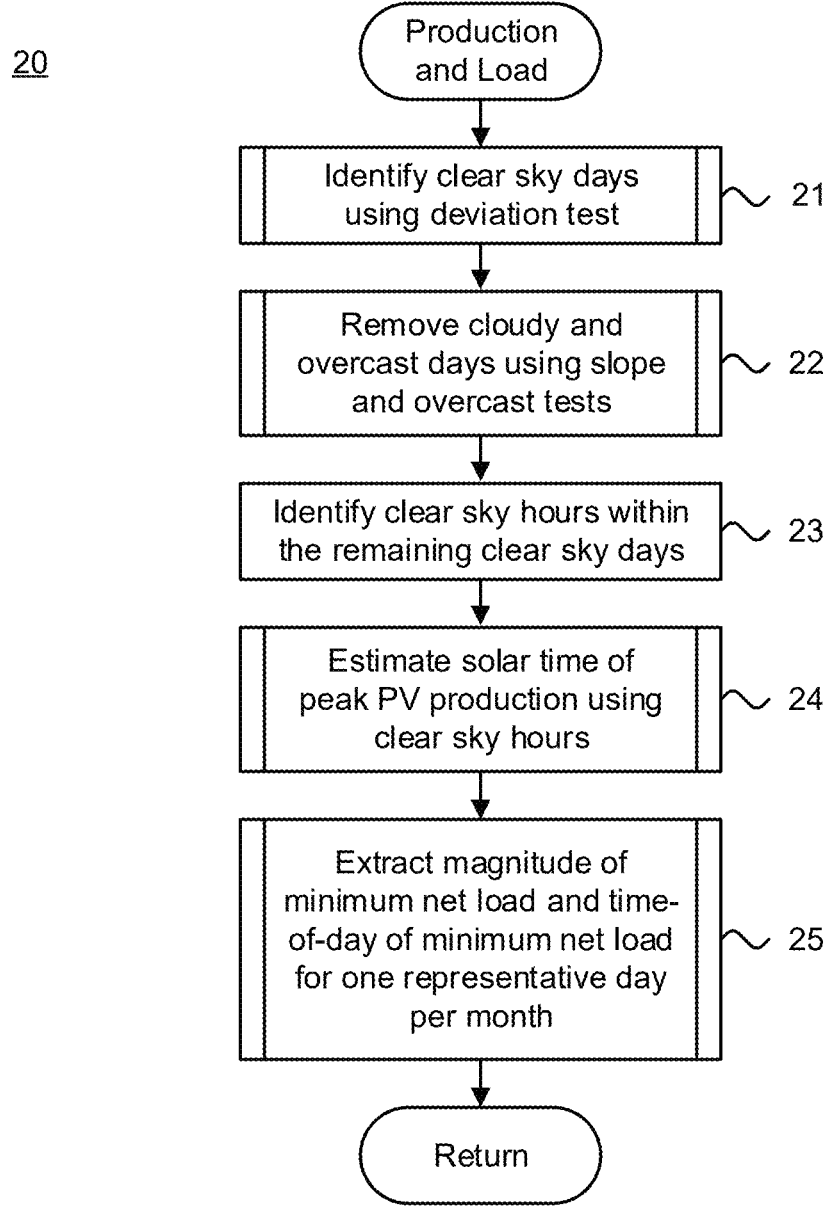
FIG. 2 is a flow diagram showing a routine for finding time of peak PV production and magnitude of minimum net load for use in the method of FIG. 1.

First, the time of peak PV production is found and magnitude of minimum net load is identified (step 13), as described in further detail supra with reference to FIG. 2. One representative day per month is selected upon which PV production is at its highest and net load is at its lowest, as presumed by selecting a day that is the clearest day among all clear sky days during the month; however, selecting more than one day is also possible.

FIG. 2 is a flow diagram showing a routine 20 for finding peak PV production and minimum net load for use in the method 10 of FIG. 1. The selection process of one representative day per month involves the following sub-steps.

Sub-Step A: Identify Clear Sky Days Using Deviation Test

Figure 3:
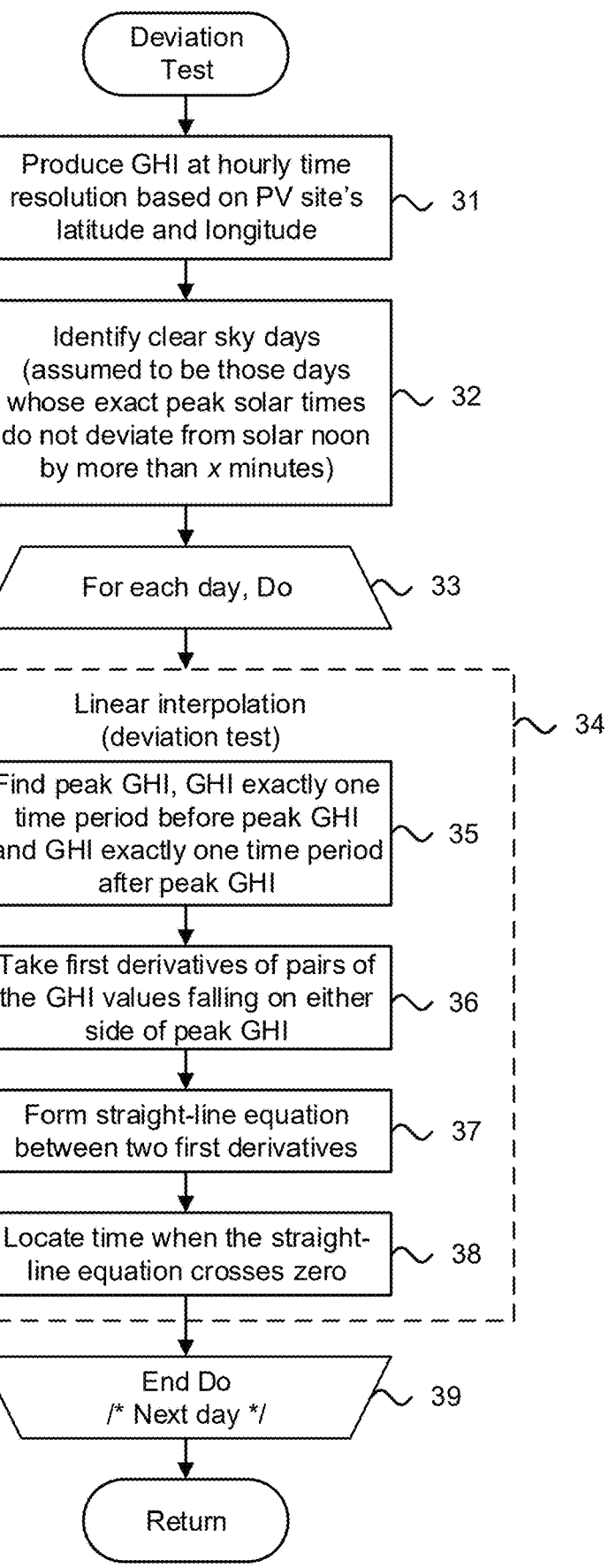
FIG. 3 is a flow diagram showing a routine for performing a deviation test for use in the routine of FIG. 2.

The first sub-step is the deviation test (step 21), as described in further detail supra with reference to FIG. 3. Briefly, a deviation test is performed to find the set of clear sky days CSD={$doy_a$, $doy_b$, ..., $doy_q$} among the set of days Y under consideration, where Y is the same set of days as the net load data, CSD⊂Y, $doy_i$ is the day-of-year identifier for the clear sky day i, |CSD|≤|Y|, and |·| represents the cardinality of the set.

FIG. 3 is a flow diagram showing a routine 30 for performing a deviation test for use in the routine 20 of FIG. 1. In this test, GHI (W/m$^2$) at an hourly time resolution for the residential site R is produced (step 31) for the same days of the year for which the net load data is available. In one embodiment, the GHI can be produced through a solar irradiance data source, such as the SolarAnywhere® service, cited infra, or other similar source, based on the residential site R's latitude and longitude. Other methods for producing GHI at a set time resolution are possible, such as described in commonly-assigned U.S. Pat. No. 8,165,811, issued to Hoff on Apr. 24, 2012; U.S. Pat. No. 8,165,813, issued to Hoff on Apr. 24, 2012; U.S. Pat. No. 8,326,535, issued to Hoff on Dec. 4, 2012, and U.S. Pat. No. 8,326,536, issued to Hoff on Dec. 4, 2012, the disclosures of which are incorporated herein by reference. Time resolutions other than hourly are also possible.

The GHI thus produced is used to identify clear sky days (step 32). Those days whose solar time of maximum or peak GHI during the day deviates within the time bounds of +/−x minutes from solar noon are identified, where x is found by testing different values of x to set a range of acceptable deviation from solar noon. In other words, clear sky days are assumed to be those days whose exact peak solar times do not deviate from solar noon by more than x minutes.

The deviation test is the first test applied. As a result, there needs to be enough days in the year that can be used by the two tests that follow, specifically, the tests to remove cloudy and overcast days from the set of days CSD identified as clear sky days, as further discussed infra with reference to FIG. 6. In one embodiment, the test applied to find x is an experimentation of different values of x. First, the GHI values of three points, peak GHI, GHI one hour before peak GHI, and GHI one hour after peak GHI, are interpolated down to the exact time from one hour, as discussed in further detail, infra. Then, x is selected. For example, if the test initially started with an x value of five minutes and if the number of days proves sufficient, for instance, 200 days out of 365 days in the year, then x is set to five minutes. However, if five minutes proves to be too stringent, where many days in the year fail to pass the deviation test, then the value of x is relaxed to 20 to 30 minutes. With this new value of x, more than half of the days in the year can be expected to be labelled as clear sky days. Other ways of finding x are possible.

Figure 4:
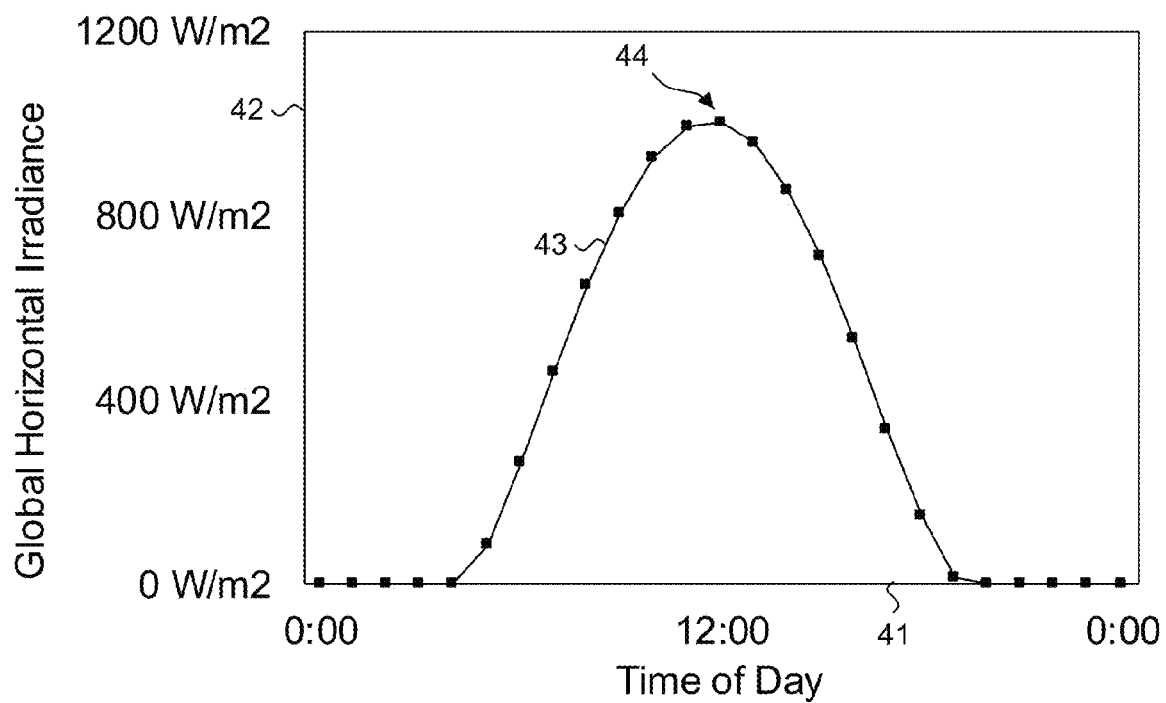
FIG. 4 is a graph showing, by way of example, global horizontal irradiance (GHI) on Jun. 21, 2015 for a location in Napa, CA.

FIG. 4 is a graph 40 showing, by way of example, global horizontal irradiance (GHI) 43 on Jun. 21, 2015 for a location in Napa, CA. The PV system installed at this location is discussed in detail supra beginning with reference to FIG. 17. The x-axis 41 represents time of day by hours. The y-axis 42 represents GHI in watts per square meter (W/m$^2$). The GHI is graphed with one-hour temporal resolution. Here, the GHI peaks 44 exactly at standard noon; however, the exact time of peak GHI may be different depending on the conditions during the day.

Linear Interpolation (Deviation Test)

Referring back to FIG. 3, to increase temporal resolution, linear interpolation (step 34) is employed to estimate the exact standard time of peak GHI for each day identified (step 33). Other interpolation methods are also possible. In the linear interpolation method, the exact standard time of peak GHI is estimated by first finding three GHI data values $GHI_t$ and their corresponding standard times t (step 35). These three data values are: (1) peak GHI, expressed $GHI_0$, (2) GHI exactly one time interval before peak GHI, expressed $GHI_{-1}$, and (3) GHI exactly one time interval after peak GHI, expressed $GHI_1$, where the subscript t is the standard time that must be in a valid range during the day and is in the given discrete temporal resolution relative to the peak GHI. The three data values: (1) $GHI_0$, (2) $GHI_{-1}$, and (3) $GHI_1$ are selected so that the analysis can be performed around the time when the sun is at the highest during the day, that is, at solar noon. In that case, the exact time when the GHI peaks is when the first derivative of GHI is zero and the second derivative of GHI is negative.

For GHI data 43 with a one-hour time resolution, such as shown in FIG. 4, $GHI_0$ is 1005 W/m$^2$, $GHI_{-1}$ is 995 W/m$^2$, and $GHI_1$ is 959 W/m$^2$. Hence, the exact time of peak GHI is assumed to be between 995 W/m$^2$ and 1005 W/m$^2$. Taking a first derivative of pairs of the GHI values falling on either side of peak GHI (step 36) can show when GHI passes solar noon to thereby find the exact time of peak GHI.

Mathematically, the first derivative of any two consecutive GHI values $\Delta GHI_t$ with time interval of one can be estimated as shown in Equation (2):

$$\Delta GHI_t = GHI(t+0.5) - GHI(t-0.5) \quad (2)$$

where, t must be in a valid time range during the day and is in the given discrete temporal resolution relative to the peak GHI during the day. t=0 corresponds to the peak GHI. Two first derivatives are derived using the three data values. Thus, the initial first derivative value estimated before the peak GHI, $\Delta GHI_{-0.5}$ is derived between $GHI_{-1}$ and $GHI_0$. The next first derivative value estimated after the peak GHI, $\Delta GHI_{0.5}$ is derived between $GHI_0$ and $GHI_1$. t is less than 0 for time before the peak and greater than 0 for time after the peak.

Next, the two first derivatives $\Delta GHI_{-0.5}$ and $\Delta GHI_{0.5}$ along with their corresponding standard times t are defined as pairs of coordinates (t, $\Delta GHI_t$). Thus, the two points defined by the two first derivatives are $(-0.5, \Delta GHI_{-0.5})$ and $(0.5, \Delta GHI_{0.5})$ where t is standard time in hours representing deviation from standard noon. Then, a straight-line equation is formed (step 37) using the two points. These two points, $(x_1, y_1)$ and $(x_2, y_2)$, respectively, can be used in a slope-intercept form of a straight line equation, to estimate the GHI first derivative-based straight line equation. The equation can be defined as:

$$y = mx + c \quad (3)$$

where, m is the slope and c is the y-intercept of the straight line. First, the slope m is evaluated as $(y_2-y_1)/(x_2-x_1)$. Then, Equation (3) is solved for the y-intercept c at any one of the two points, for example, at $(x_1, y_1)$, as $c = y_1 - mx_1$. Finally, Equation (3) is used to estimate the exact time when the sun is at its peak, that is, at solar noon. To do this, Equation (3) is evaluated at the point where the GHI first derivative is zero, that is, Equation (3) is solved for x at y=0 such that $$x = -\frac{c}{m}.$$

Thus, the exact time when the straight-line equation crosses zero is located (step 38), which is assumed to be the exact time of peak GHI.

Figure 5:
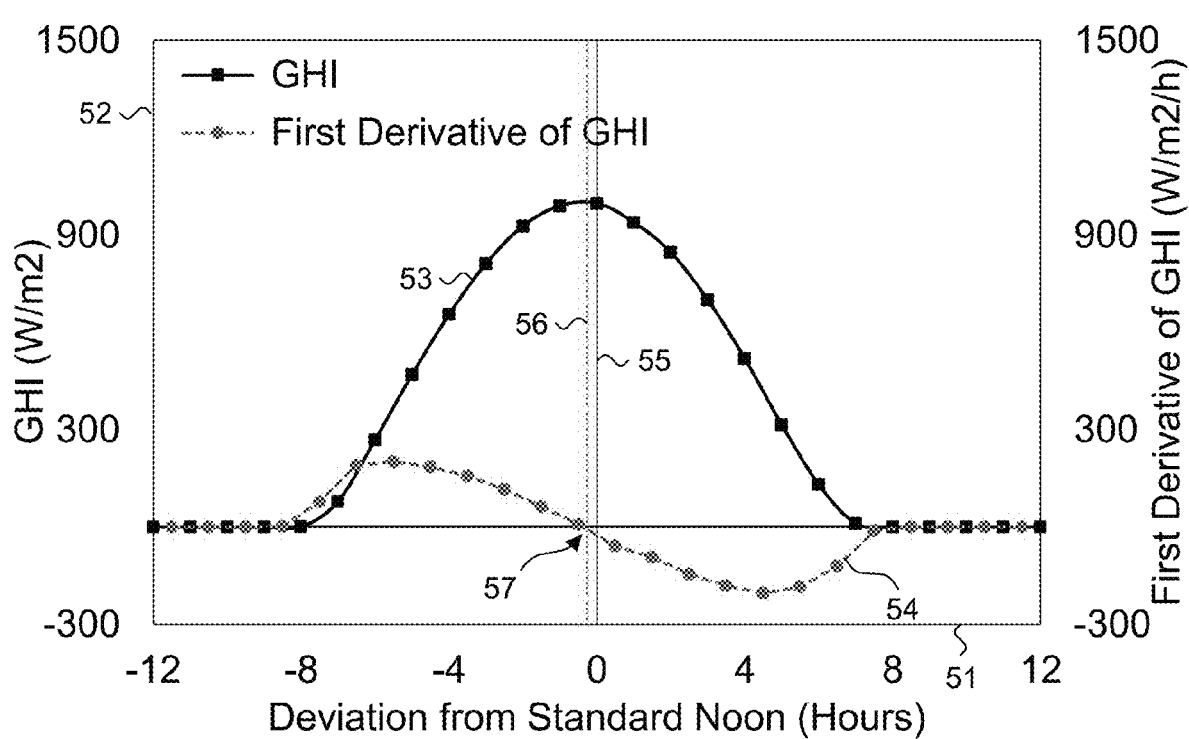
FIG. 5 is a graph showing, by way of example, GHI and the first derivative of GHI on Jun. 21, 2015 for a location in Napa, CA.

FIG. 5 is a graph 50 showing, by way of example, GHI 53 and the first derivative of GHI 54 on Jun. 21, 2015 for a location in Napa, CA. The x-axis 51 represents deviation from standard noon in hours. The y-axis 52 represents GHI in W/m². The vertical solid line 55 shows the apparent peak GHI, whereas the vertical dashed line 56 shows the exact time of the peak GHI. For FIG. 5, $GHI_0$ is 1005 W/m², $GHI_{-1}$ is 995 W/m², and $GHI_1$ is 959 W/m² as shown by the points in the solid curve 53. Hence, $\Delta GHI_{-0.5}$ is 10 W/m² and $\Delta GHI_{0.5}$ is −46 W/m² as shown by the points in the dashed curve 54. Thus, the two points $(x_1, y_1)$ and $(x_2, y_2)$, are (−0.5, 10) and (0.5, −46) respectively. Using Equation (3), the GHI first derivative straight-line equation is 56x+y+18=0. The slope is −56 and y-intercept is −18. Solving for x with y=0 gives x=−18/56. Hence, the exact standard time of peak GHI is 18/56 hours before standard noon or approximately 19 minutes before standard noon i.e., approximately 30 minutes before solar noon.

Linear interpolation (step 34) is repeated over the entire set of days Y under consideration, where Y is the same set of days as the net load data (step 39). Finally, using the deviation test, the complete set of clear sky days CSD among the set of days Y under consideration are found (step 21).

Sub-Step B: Remove Cloudy and Overcast Days Using Slope and Overcast Tests

While assumed to be clear, the set of days CSD identified as clear sky days (step 21) may still include cloudy CLD and overcast OD days. Hence, in the second sub-step, a slope test and an overcast test are undertaken (step 22), as described in further detail supra with reference to FIG. 6, to respectively remove cloudy and overcast days from the set of days CSD identified as clear sky days.

Figure 6:
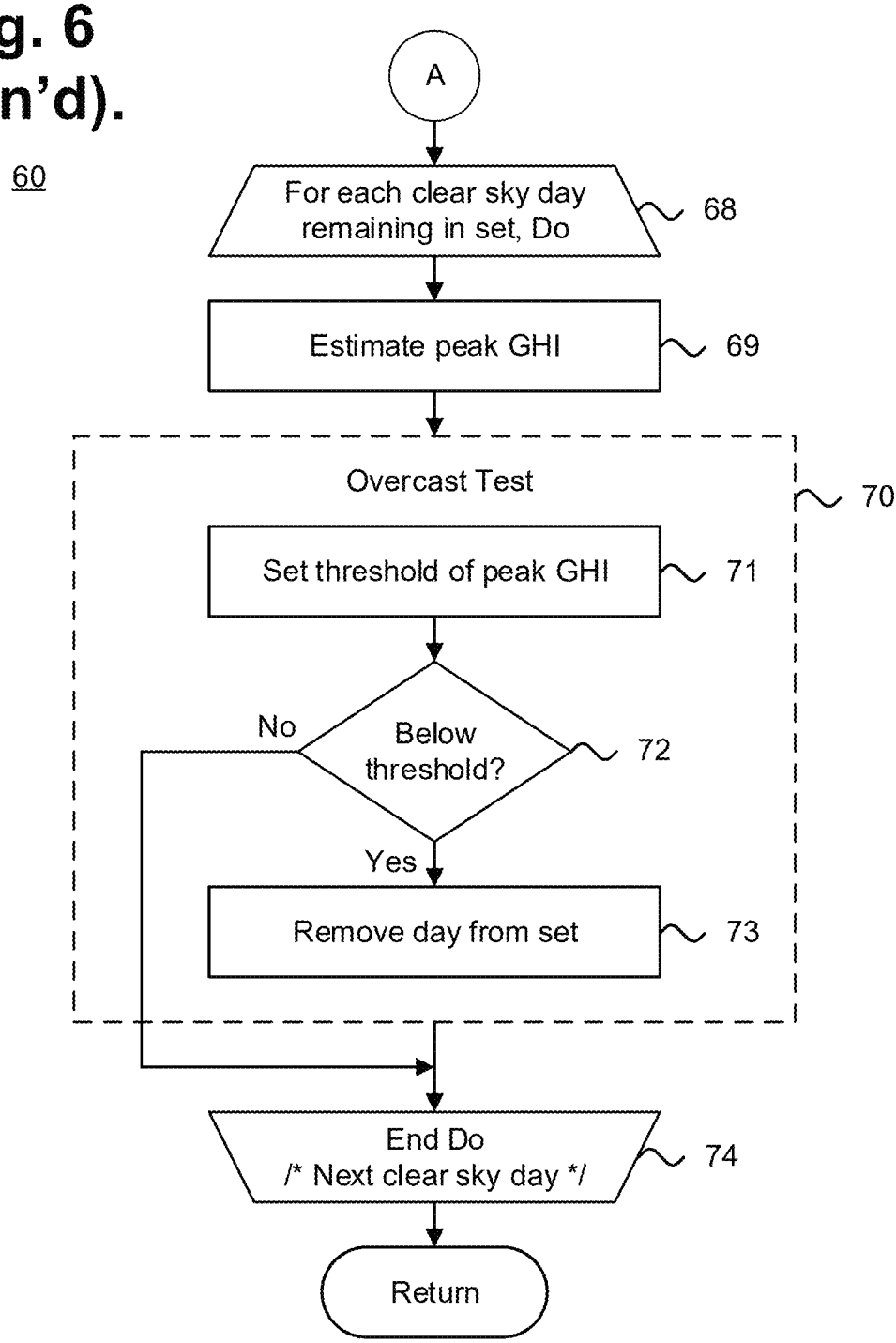
FIG. 6 is a flow diagram showing a routine for removing cloudy and overcast days for use in the routine of FIG. 2.

FIG. 6 is a flow diagram showing a routine for removing cloudy and overcast days for use in the routine of FIG. 2. For each of the days CSD that passed the deviation test (step 61), a straight-line equation is formed (step 62), again based on the two points (−0.5, $\Delta GHI_{-0.5}$) and (0.5, $\Delta GHI_{0.5}$) using Equation (3). The straight-line equation is solved for the exact standard time when the equation crosses zero. The slope test (step 63) and overcast test (step 70) are then undertaken as follows:

Slope Test

The slope of the solution to the straight-line equation is calculated for the set of days CSD (step 64). For each month, the median slope of the straight-line equation is also found using the set of days CSD (step 65). Finally, for each month, those days whose slope of the straight-line equation exceeds the median slope of each month are regarded as cloudy days CD and removed from the set of clear sky days CSD (step 66).

Figure 7:
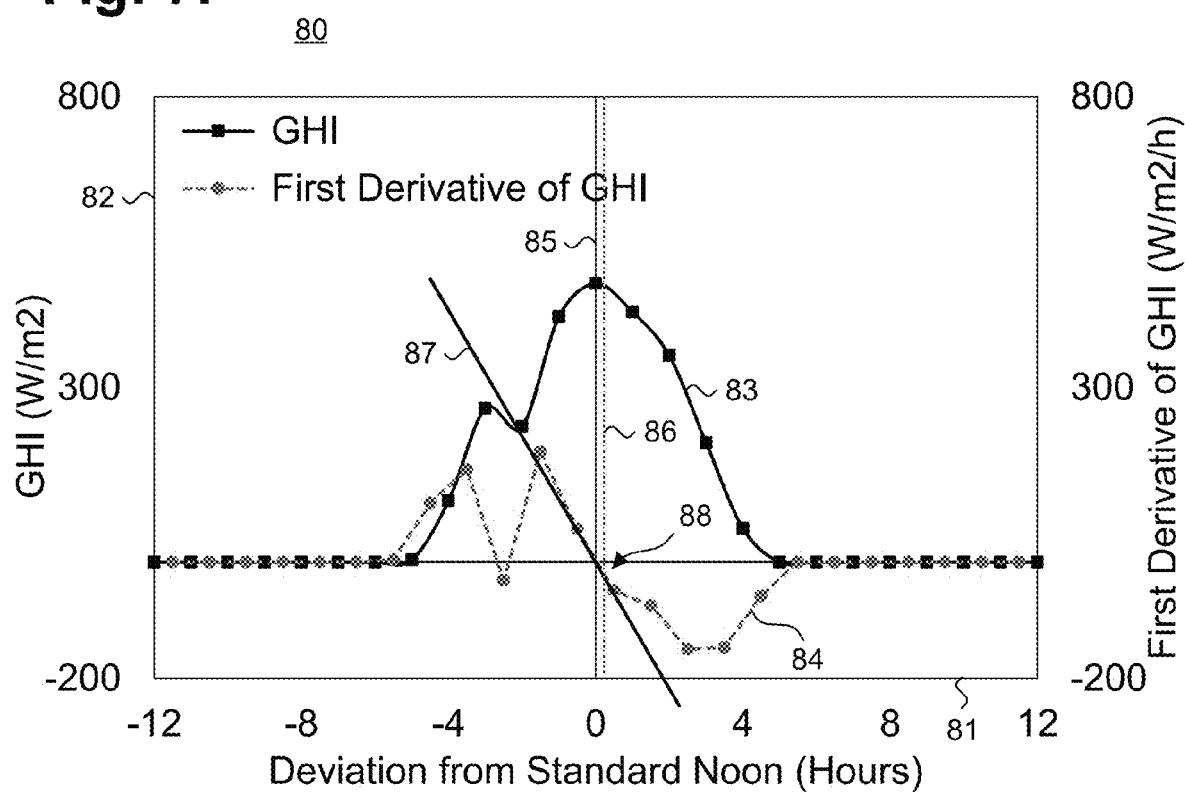
FIG. 7 is a graph showing, by way of example, GHI and the first derivative of GHI on a cloudy day on Jan. 4, 2015 for a location in Napa, CA.

FIG. 7 is a graph 80 showing, by way of example, of GHI 83 and the first derivative of GHI 84 on a cloudy day on Jan. 4, 2015 for a location in Napa, CA. The x-axis 81 represents deviation from standard noon in hours. The y-axis 82 represents GHI in W/m². The vertical solid line 85 shows the apparent peak GHI, whereas the vertical dashed line 86 shows the exact time of peak GHI. The tilted solid line 87 shows the solution to the straight-line equation formed using the two first derivatives per points (−0.5, $\Delta GHI_{-0.5}$) and (0.5, $\Delta GHI_{-0.5}$) defined in Equation (3). The exact peak solar time 88 of the GHI occurs three minutes after solar noon. Thus, this day passes the deviation test (step 21), discussed infra, as the peak time 88 of the GHI peaks within +/− x minutes of solar noon, where x was assumed to be five minutes. However, the slope of the first derivative straight-line equation 87 exceeded the median slope for the month of January 2015 (not shown) for the location in Napa, CA. Here, the median slope for January 2015 is −134. The slope for Jan. 4, 2015 is −118. Thus, the Jan. 4, 2015 slope is greater than the median slope of January 2015. Hence, in this example, Jan. 4, 2015 would be classified as a cloudy day and removed from the set of clear sky days.

Referring back to FIG. 6, using the slope test (step 63), each remaining clear sky day in the set of clear sky days CSD is evaluated (step 67) and the set of clear sky days CSD is further filtered to remove set of cloudy days CLD to obtain set CSD–CLD, such that |CSD–CLD|≤|CSD|≤|Y|.

Overcast Test

Next, for each of the days remaining in the set of days CSD-CLD (step 68), peak GHI, defined as $GHI_0$, is first estimated (step 69). Each day that has peak GHI falling below a threshold (step 72) is assumed to be an overcast day and is removed from the set (step 73). This threshold is set (step 71) to x % of peak GHI during the discrete period under consideration, such as a month. In one embodiment, x is typically assumed to be 20% of peak GHI. This value was chosen based on the peak GHI values of the site under consideration. For example, for the Napa location, if peak GHI for June 2015 was 1000 W/m², then the days falling below 200 W/m² was assumed to be overcast days. Other ways of choosing x are possible.

Using the overcast test (step 70), each remaining day in the set of clear sky days CSD-CLD is evaluated (step 74) and the set of days CSD-CLD is further filtered to remove the set of overcast days OD to obtain the set CSD-CLD-OD, such that |CSD-CLD-OD|≤|CSD-CLD|≤|CSD|≤|Y|. The subsequent set CSD-CLD-OD is named as $CSD_{final}$.

An example can help illustrate the effects of identifying and filtering clear sky days. Table 1 shows, by way of example, the remaining number of days in different years after the consecutive application of the deviation, slope, and overcast tests, which were applied to the GHI of a test system in Napa, CA from 2015 through 2019. In 2015, out of a total of 365 days, 167 days passed the deviation test. Among these 167 days, only 145 days passed the slope and overcast tests consecutively to be classified as clear sky days.

TABLE 1

| Year | Deviation Test | Slope Test | Overcast Test |
|---|---|---|---|
| 2015 | 167 | 145 | 145 |
| 2016 | 135 | 111 | 108 |
| 2017 | 143 | 114 | 109 |
| 2018 | 150 | 125 | 124 |
| 2019 | 124 | 117 | 92 |

Sub-Step C: Identify Clear Sky Hours within the Remaining Clear Sky Days

Referring back to FIG. 2, the third sub-step is the identification of clear sky hours CSH within each of the clear sky days in set $CSD_{final}$ obtained from the deviation, slope, and overcast tests (step 23). This test involves finding first derivatives of GHI which are close to the straight-line equation, discussed infra, as formed using two points, as defined by the two points $(-0.5, \Delta GHI_{-0.5})$ and $(0.5, \Delta GHI_{0.5})$ and formally stated in Equation (3), which represents the two first derivatives and their corresponding times t.

This test is performed using an iterative screening process using all first derivatives of consecutive GHI values found using Equation (2). In this screening process, one immediate neighbor of either $\Delta GHI_{-0.5}$ or $\Delta GHI_{0.5}$ is considered and the $R^2$ coefficient of the determination of $\Delta GHI_{-0.5}$, $\Delta GHI_{0.5}$, and the neighboring GHI first derivative with respect to the straight-line equation are estimated. The $R^2$ coefficient represents the goodness of fit. An $R^2$ coefficient of 1 is considered the best possible score, whereas an $R^2$ coefficient of −1 is regarded as the worst possible score.

For example, in the first iteration, the three GHI first derivatives $(\Delta GHI_{-1.5}, \Delta GHI_{-0.5}, \Delta GHI_{0.5})$ can be considered. In the second iteration, another set of three GHI first derivatives $(\Delta GHI_{-0.5}, \Delta GHI_{0.5}, \Delta GHI_{1.5})$ can be considered. If the $R^2$ coefficient satisfies a threshold, that is, the threshold is close to the best score of 1, then the neighboring GHI first derivative is regarded as a clear sky first derivative of GHI. In one embodiment, the lower bound of the $R^2$ score threshold was set to 0.9 and the upper bound was set to 1, that is, $R^2$ scores of GHI first derivatives need to fall between 0.9 and 1. Else, those GHI first derivatives will not pass the threshold.

Thus, if $(\Delta GHI_{-1.5}, \Delta GHI_{-0.5}, \Delta GHI_{0.5})$ exceed the $R^2$ goodness of fit threshold, then in the next iteration, these three first derivatives and another neighboring GHI first derivative are considered. For example, $(\Delta GHI_{-2.5}, \Delta GHI_{-1.5}, \Delta GHI_{-0.5}, \Delta GHI_{0.5})$ can be considered in the next iteration. This process is repeated for all first derivatives of GHI for the day in consideration until the $R^2$ goodness of fit threshold is violated and the process stops.

Figure 8:
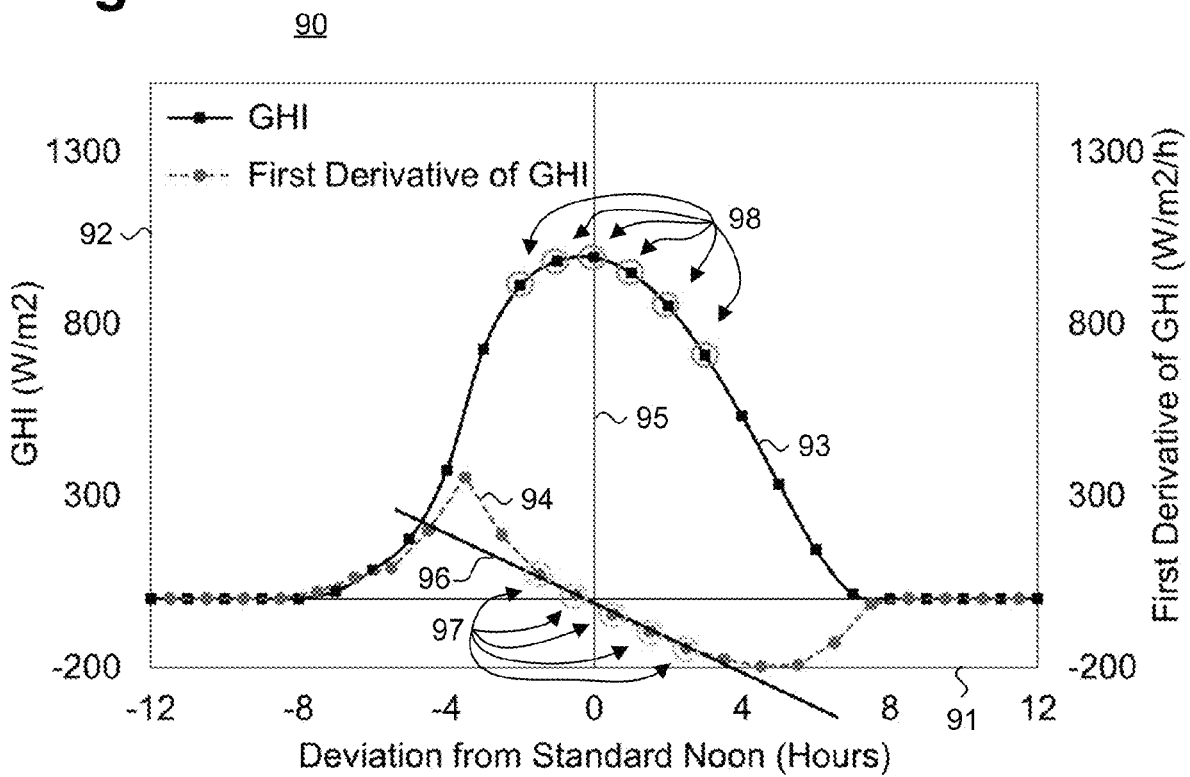
FIG. 8 is a graph showing, by way of example, GHI and the first derivative of GHI on Jul. 8, 2015 for a location in Napa, CA.

FIG. 8 is a graph 90 showing, by way of example, GHI 93 and the first derivative of GHI 94 on Jul. 8, 2015 for a location in Napa, CA. This day has passed the deviation, slope, and overcast tests. The x-axis 91 represents deviation from standard noon in hours. The y-axis 92 represents GHI in W/m². The vertical solid line 99 shows the apparent peak GHI. The tilted solid line 97 shows the solution to the straight-line equation formed using the two first derivatives per points $(-0.5, \Delta GHI_{-0.5})$ and $(0.5, \Delta GHI_{0.5})$. The five dashed circles 97 represent the GHI first derivatives 94 that have exceeded the $R^2$ coefficient threshold and are assumed to be the clear sky GHI first derivatives. Consequently, the six solid circles 98 are assumed to be the values of clear sky GHI 93 from which the five GHI first derivatives 94 have been derived and that have exceeded the $R^2$ coefficient threshold, as represented by the circles 97.

Sub-Step D: Filter Net Load and Cross Reference with GHI Clear Sky Days

Referring back to FIG. 2, as discussed infra, GHI data for the same location as the PV site under consideration is used for identifying clear sky days $CSD_{final}$ and clear sky hours CSH. In one embodiment, the GHI data can be produced through a solar irradiance data source, such as the SolarAnywhere® service, cited infra, or other similar source, based on the residential site R's latitude and longitude. GHI data is used since net load data itself does not contain direct information regarding the sky-conditions during the day. However, the goal of finding clear sky days $CSD_{final}$ and clear sky hours CSH is to use this information to estimate the exact peak time using net load data. Thus, in the fourth sub-step, the clear sky days $CSD_{final}$ and the clear sky hours CSH within the clear sky days are used for estimating the exact time when the PV system peaks (step 24) using the net load data NL, as described in further detail supra with reference to FIG. 9. This step filters the net load data using two steps: 1) by checking the magnitude of minimum net loads, and 2) by checking the sign of net loads before and after the minimum net load. Then, the remaining days that have passed the two tests are cross-referenced with clear sky days and clear sky hours identified in the previous step.

Figure 9:
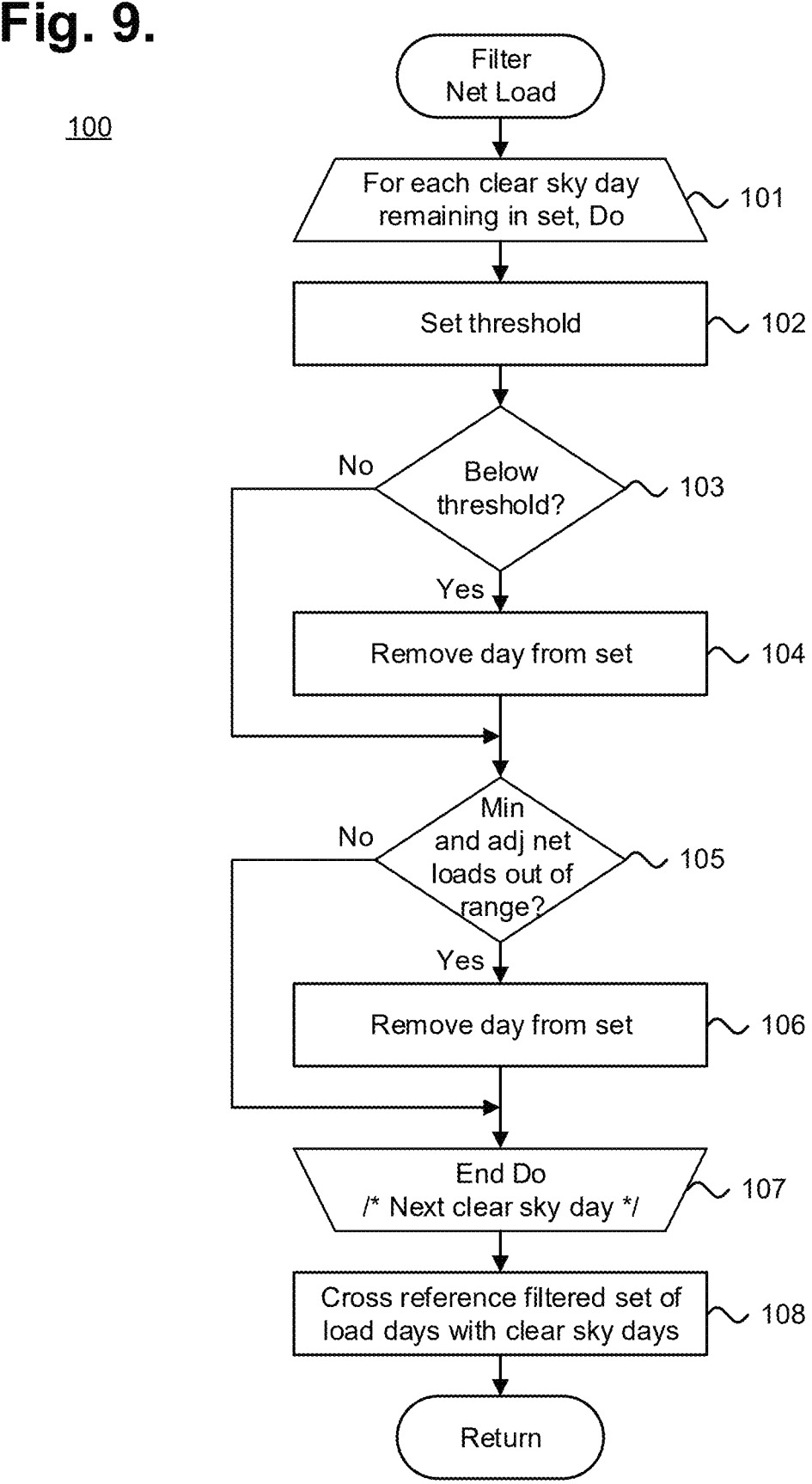
FIG. 9 is a flow diagram showing a routine for filtering net load and cross referencing with clear sky days derived using GHI for use in the routine of FIG. 2.

For this estimate, the net load data NL is filtered. The filtered set of days from the net load data is assumed to be NLD={$doy_a, doy_b, \ldots, doy_q$}, where NLD ⊂ Y, $doy_i$ is the day-of-year identifier for the net load day i, |NLD|≤|Y|, Y represents the set of days in consideration, and |·| represents the cardinality of the set. FIG. 9 is a flow diagram showing a routine 100 for estimating the exact time when the PV system peaks for use in the routine of FIG. 2. For each of the days in the set of NLD (step 101), a filtration process is performed as follows.

First, each day whose magnitude of minimum net load falls below a threshold of net load (step 103) are removed from the set of days Y under consideration (step 104). A different threshold is set for each month (step 102), such that threshold $T_i$ for month $M_i \in M$, where M={$M_1, M_2, \ldots, M_{12}$} represents the twelve months in a year. $T_i$ is defined as x % of the magnitude of the minimum net load for month $M_i$. In one embodiment, x was defined as 85% of the magnitude of minimum net load. Through experimentation, x was defined as 95%, but this value proved too stringent and most of the days in the year did not pass the test. The criteria were then relaxed to 85%. For example, for January, the minimum net load of each day during the month was estimated such that the set of minimum net loads for January contained 31 values. Then, among the set of minimum net loads, the most minimum value was estimated and 85% of the value was assumed to be the threshold for that month. All days in January whose magnitude of minimum net load falls below this threshold are removed. Other ways of defining x are possible.

Second, each day whose minimum net load $NL_0$ and net loads immediately adjacent to the minimum net load, that is, the net load exactly one time interval before the minimum net load $NL_{-1}$ and the net load exactly one time interval after the minimum net load $NL_1$, contain loads other than PV and baseloads (step 105) are also removed (step 106). Net load is assumed to contain loads other than PV production or baseloads if any of the three net load values $NL_0$, $NL_{-1}$, and $NL_1$ contain positive net load values. Here, the subscript t in the definition of $NL_t$ must be in a valid range during the day and is in the given discrete temporal resolution relative to the minimum net load value.

Following filtering, the filtered set of net load days NLD is cross-referenced (step 108) with the clear sky days $CSD_{final}$ as obtained following the deviation, slope, and overcast tests, as described infra with reference to FIG. 3 and FIG. 6. A set $NLD_{final}$, which represents the net load days assumed to be clear sky, is formed from the set of days that belong to both $CSD_{final}$ and NLD.

Figure 10:
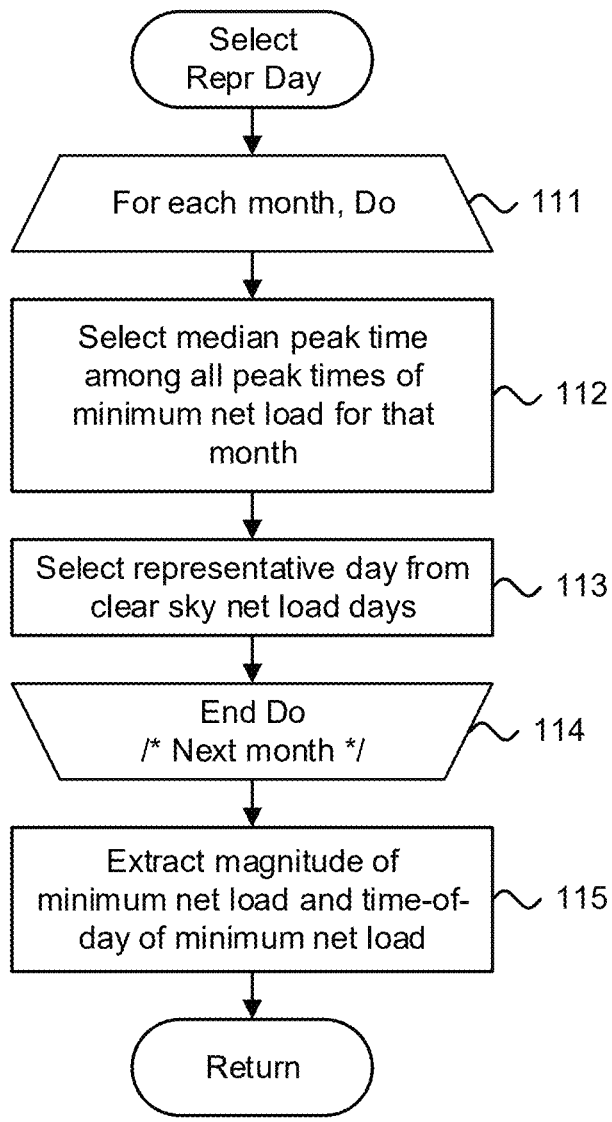
FIG. 10 is a flow diagram showing a routine for extracting the magnitude of minimum net load and the time-of-day of minimum net load (time of peak PV production) for one representative day per month for use in the routine of FIG. 2.

Sub-Step E: Extract a Magnitude of Minimum Net Load and a Time-of-Day of Minimum Net Load (Time of Peak Pv Production) for One Representative Day Per Month Referring back to FIG. 2, the magnitude of minimum net load and the time-of-day of minimum net load (time of peak PV production) for one representative day per month is extracted (step 25), as described in further detail supra with reference to FIG. 10. The representative day is found based on the exact time of peak PV production, as determined from the clear sky days. FIG. 10 is a flow diagram showing a routine for extracting the magnitude of minimum net load and the time-of-day of minimum net load (time of peak PV production) for one representative day per month for use in the routine of FIG. 2. First, for each month (step 111), a median time is selected (step 112) from all times of minimum net load derived using the set of clear sky net load days $NLD_{final}$ during that month. Then, the day corresponding to the median time is regarded as the representative day (step 113). This step is repeated for each month of the year (step 114) to obtain the set of representative days D= $\{D_a, D_b, \ldots, D_q\}$, where $D_x$ represents the net load values for the selected representative day in month $M_x$ and the upper bound on the number of days in set D is 12. Next, two parameters are extracted (step 115) for each item in set D, the magnitude of minimum net load $|min(D_x)|$ and time-of-day of minimum net load (time of peak PV production) TOD $(min(D_x))$ for $D_x \in D$. The time-of-day of minimum net load is assumed to be the time-of-day of peak PV production.

FIG. 11 is a graph showing, by way of example, the net load profile 123 of the selected representative days D in 2016 for a location in Napa, CA. The x-axis 121 represents time of day by hours. The y-axis 122 represents net load in kilowatts per hour (kWh). The data for each month's net load was obtained from net load data for this location based on net energy metering. The net load profile 123 is graphed with one-hour temporal resolution for one selected day per month, as listed in the column next to the graph. Thus, using the method described in FIG. 10, FIG. 10 is a flow diagram showing a routine for extracting the magnitude of minimum net load and the time-of-day of minimum net load (time of peak PV production) for one representative day per month for use in the routine of FIG. 2. January 7 was selected as the representative day for January 2016, February 29 was selected for February 2016, and so on. Each net load shows the combination of electricity as supplied to the customer by the utility during non-daylight hours when there was no PV production and shows excess PV production generated by the customer's PV system that was back-fed to the power distribution grid.

Step 2: Estimate Base Loads

Referring back to FIG. 1, a set of base loads for the PV site is estimated (step 14), such as described in commonly-assigned U.S. Pat. Nos. 10,747,914, issued to Hoff on Aug. 18, 2020; and U.S. Pat. No. 11,416,658, issued to Hoff on Aug. 16, 2022, the disclosures of which are incorporated herein by reference. A PV site's base load electricity usage can be defined as the minimal amount of energy during each discrete period under consideration, such as a month, that is consistently consumed. A frequency distribution method is applied to the estimated net loads to determine the most frequently occurring net load, which is assumed to be the base load. This process is repeated for each month to obtain a set of base loads B=$\{B_a, B_b, \ldots, B_q\}$, where $B_x$ represents the base load for month $M_x$ and the upper bound on the number of base loads in set B is 12.

FIG. 12 is a graph showing, by way of example, the frequency distribution 133 of various net loads for the location in Napa, CA in April 2016. The x-axis 131 represents the net loads in kW. The y-axis represents the frequency of occurrences 132 of the net loads. Based on the most frequently occurring net load, the base load for April 2016 is 0.5 kW.

Step 3: Produce Plane-of-Array Irradiance (POAI) Using Clear Sky GHI for Various Azimuth and Tilt Combinations Referring back to FIG. 1, a ground truth dataset is created by producing POAI data (step 16) from clear sky GHI data for the same location as the PV site under consideration with various azimuth and tilt combinations for each of the representative days D. In one embodiment, the GHI data can be produced through a solar irradiance data source, such as the SolarAnywhere® service, cited infra, or other similar source, based on the residential site R's latitude and longitude. The number of azimuth and tilt combinations under consideration can vary. For example, azimuths from 0° to 355° in 5-degree increments and tilts from 0° to 90° in 5-degree increments suggest that there are 1368 azimuth and tilt combinations. Similarly, azimuths from 0° to 350° in 10-degree increments and tilts from 0° to 90° in 5-degree increments suggest that there are 684 azimuth and tilt combinations. The azimuths A and tilts T combinations are denoted as C=$\{(az_1, tilt_1), (az_2, tilt_2), \ldots, (az_n, tilt_n)\}$, where $az_i \in A$, $tilt_i \in T$, n is $|A| \times |T|$, and $|\cdot|$ represents the cardinality of the set.

Note that direct normal irradiance (DNI) is also used for the production of POAI along with GHI. Here, the focus is mainly on clear-sky GHI, instead of GHI alone, so as to produce ground truth data with the assumption that all days in the year are clear sky, particularly as the major contribution towards POAI is from GHI, rather than DNI. Furthermore, after PV system specifications have been inferred, GHI, and not clear-sky GHI, is used to produce simulated PV production. Hence, clear-sky GHI will be emphasized in this discussion.

The POAI data is produced from clear sky GHI data for the same location as the PV site under consideration using: (1) the representative days D used for the set of net loads, as determined by the methodology described infra with reference to FIG. 10, and (2) the various azimuth and tilt combinations in set C. The POAI data thus obtained is denoted by $I_{(az_i, tilt_j)} = \{DIa_i\ DI_p, \ldots, DI_q\}$, where $DI_x$ represents the POAI values for day $DI_x \in D$ in the same time resolution as net load and $(az_i, tilt_j) \in C$.

POAI data is produced for all of the azimuth and tilt combinations in set C to obtain $I = \{I_{(az_1, tilt_1)}, I_{(az_2, tilt_2)}, \ldots, I_{(az_n, tilt_n)}\}$. The cardinality of set/is $n \times |D|$ or $|A| \times |T| \times |D|$. Next, two parameters are extracted from each entry in $I_{(az_i, tilt_j)}$, the time-of-day of maximum POAI TOD (max $(DI_x)$) and the magnitude of maximum POAI $|max(DI_x)|$ for $DI_x \in I_{(az_i, tilt_j)}$, so time-of-day of maximum POAI and magnitude of maximum POAI values will be found for all of the azimuth and tilt combinations in set C.

Figure 13:
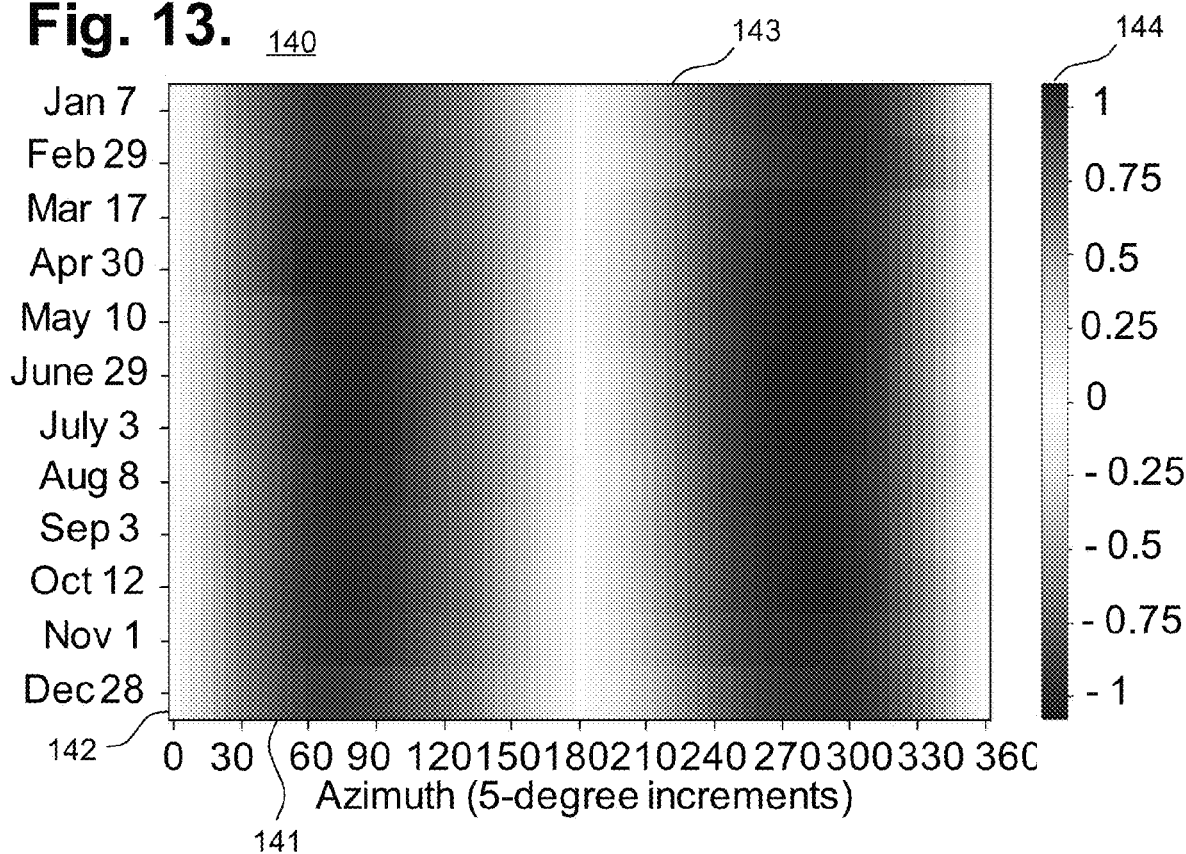
FIG. 13 is a graph showing, by way of example, the time-of-day of maximum POAI in terms of deviation from solar noon for the location in Napa, CA.

FIG. 13 is a graph 140 showing, by way of example, the time-of-day of maximum POAI 143 in terms of deviation from solar noon for the location in Napa, CA. The x-axis 141 represents azimuth in five-degree increments. The y-axis 142 represents date. The time-of-day of maximum POAI 143 is depicted for various azimuths over 5° increments for a tilt of 25°. The color bar 144 next to the graph 140 shows the deviation from solar noon in hours.

Figure 14:
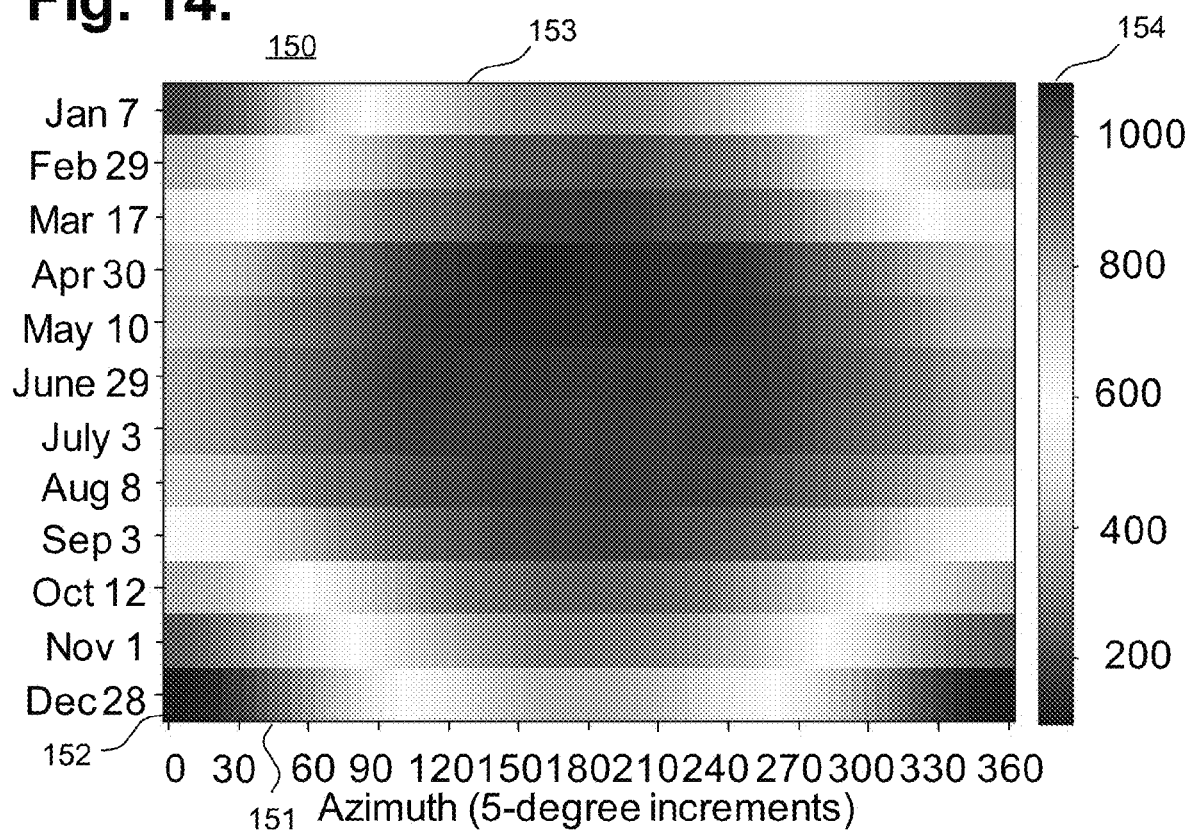
FIG. 14 is a graph showing, by way of example, the magnitude of maximum POAI for the location in Napa, CA.

FIG. 14 is a graph 150 showing, by way of example, the magnitude of maximum POAI 153 for the location in Napa, CA. The x-axis 151 represents azimuth in five-degree increments. The y-axis 152 represents date. The magnitude of maximum POAI 153 is depicted for various azimuths over 5° increments for a tilt of 25°. The color bar 154 next to the graph 150 shows the magnitude in $W/m^2$.

Step 4: Identify Azimuth, Tilt, and System Size (or Rating)

Figure 15:
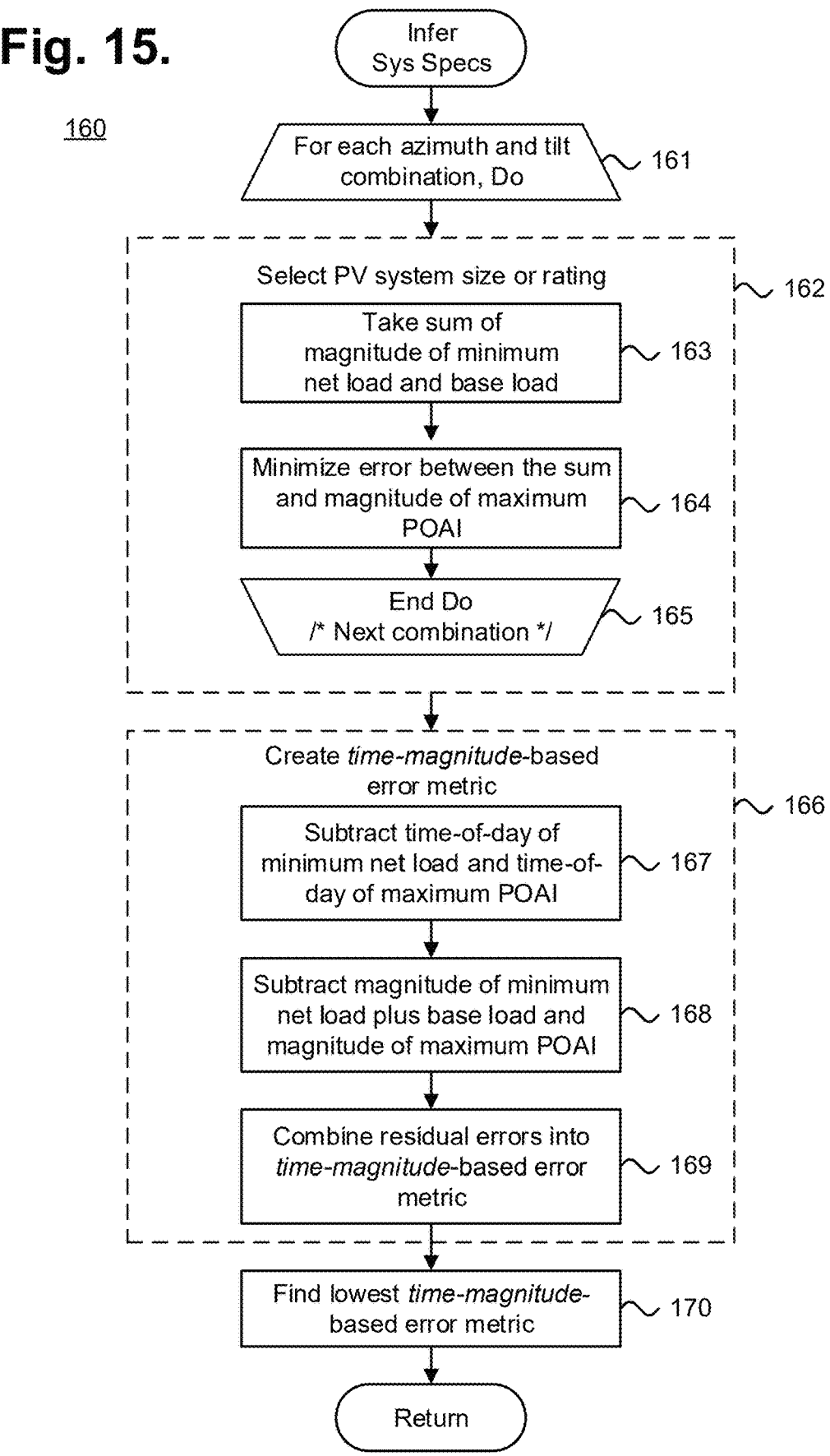
FIG. 15 is a flow diagram showing a routine for finding optimal azimuth, tilt, and system size (or rating) values for use in the routine of FIG. 1.

Referring back to FIG. 1, the optimal azimuth $P_{az}$, tilt $P_{tilt}$, and size $P_{size}$ of the site's PV system P is estimated (step 17) by finding the lowest error metric among possible combinations of azimuth, tilt and system size (or rating) for the PV system, as described in further detail supra with reference to FIG. 15. The selected azimuth, tilt, and system size (or rating) values are considered optimal and are provided to the utility as the inferred system specifications for the residential PV system under consideration. The utility can then use these inferred optimal system specifications in performing load forecasting and other grid operations with a higher degree of confidence than would otherwise be available using consumer-provided system specifications.

FIG. 15 is a flow diagram showing a routine 160 for finding optimal azimuth, tilt, and system size (or rating) values for use in the routine of FIG. 1. First, a system size or rating $rtg_i$ is selected (step 162) for each azimuth and tilt combination $(az_i, tilt_i)$ (step 161) in set C as follows. Variable one, which is labelled as $(|min(D_x)| + B_x)$ is the sum of the magnitude of minimum net load $|min(D_x)|$ and base load $B_x$ for the corresponding months $M_x$ (step 163). Variable two, which is labelled as $(rtg_i^* |max(DI_x)|)$, is the multiplication of magnitude of maximum POAI values $|max(DI_x)|$ for the corresponding month $M_x$ times the variable to be determined i.e., PV system rating $rtg_i$. Then, the error between variable one and variable two for all days in the set of representative days D is minimized (step 164), per Equation (4):

$$\min \Sigma((|min(D_x)| + B_x) - (rtg_i^* |max(DI_x)|)) \forall D, \forall C \quad (4)$$

Solving Equation (4) for each of the azimuth and tilt combinations in set C finds the system size or rating $rtg_i$ associated with each azimuth and tilt combination in set C. Equation (4) is solved 1368 times if azimuths are considered from 0° to 355° in 5-degree increments and tilts are considered from 0° to 90° in 5-degree increments. Similarly, if azimuths are considered from 0° to 350° in 10-degree increments and tilts from 0° to 90° in 5-degree increments, then Equation (4) is solved 684 times. Thus, the selection process to find system size or rating $rtg_i$ is repeated for each of the azimuth and tilt combinations (step 165). This process expands the initial definition of set C from $C = \{(az_1, tilt_1), (az_2, tilt_2), \ldots, (az_n, tilt_n)\}$ to the complete set of azimuth, tilt, and system ratings as $C = \{(az_1, tilt_1, rtg_1), (az_2, tilt_2, rtg_2), \ldots, (az_n, tilt_n, rtg_n)\}$.

Then, a time-magnitude-based error metric is created (step 166). This metric considers the error in time-of-day of minimum net load (time of peak PV production) and time-of-day of maximum POAI, as well as the error in magnitude of minimum net load plus base load and maximum POAI. The time-of-day of minimum net load (time of peak PV production) $TOD(min(D_x))$ and time-of-day of maximum POAI $TOD(max(DI_x))$ for corresponding days in the set of representative days D and for all azimuth, tilt, and rating combinations in the expanded set C are subtracted (step 167). Similarly, magnitude of minimum net load $|min(D_x)|$ plus the baseload $B_x$ for the corresponding months $M_x$ and magnitude of maximum POAI $|max(DI_x)|$ for all azimuth, tilt, and rating combinations in the expanded set C are also subtracted (step 168). These two residual errors are combined (step 169) to form a time-magnitude-based error metric. Finally, the optimal system specifications are found by finding the lowest time-magnitude-based error metric among the errors for the various azimuth, tilt, and rating combinations (step 170). For azimuths considered from 0° to 355° in 5-degree increments and tilts considered from 0° to 90° in 5-degree increments, there are 1368 time-magnitude-based errors. Similarly, if azimuths are considered from 0° to 350° in 10-degree increments and tilts from 0° to 90° in 5-degree increments, there are 684 time-magnitude-based errors. The azimuth, tilt, and rating combination $(az_i, tilt_i, rtg_i)$ associated with the minimum time-magnitude-based error (among the 1368 or 684 errors defined using the azimuth and tilt increment definitions) corresponds to the inferred PV system specifications.

Figure 16:
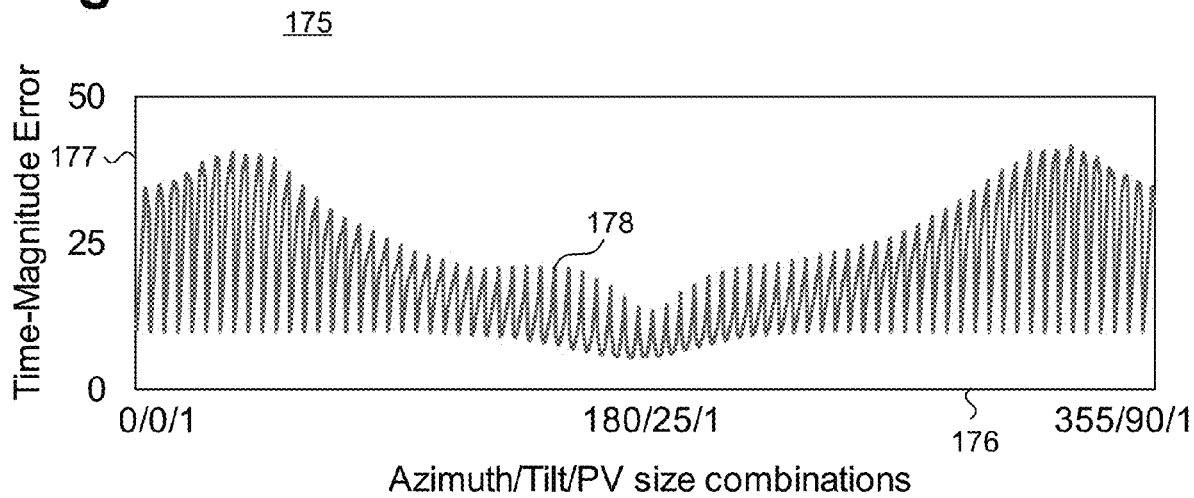
FIG. 16 is a graph showing, by way of example, the time-magnitude-based error for the location in Napa, CA for azimuths from 0° to 355° in 5-degree increments and tilts from 0° to 90° in 5-degree increments.

FIG. 16 is a graph 175 showing, by way of example, the time-magnitude-based error 178 for the location in Napa, CA for azimuths from 0° to 355° in 5-degree increments and tilts from 0° to 90° in 5-degree increments. The x-axis 176 represents the indices of the set of azimuth, tilt, and system ratings C. The y-axis 177 represents the values of the time-magnitude-based errors. The various combinations of azimuths from 0° to 355° in 5-degree increments and tilts from 0° to 90° in 5-degree increments suggests 1368 azimuth, tilt, and system size (or rating) combinations, out of which the combination having the lowest time-magnitude-based error metric is selected to provide the inferred system specifications of the PV system under consideration.

Empirical Results

A single photovoltaic system's power capacity, expressed in units of Watt peak (Wp), is measured by maximum power output, as determined under standard test conditions. Actual power can vary from the rated system power capacity depending on geographic location, time of day, weather conditions, and other factors. A PV system with a nameplate rating of 6 $kW_{DC}$ installed in Napa, CA, with azimuth 168° and tilt 23° has been used throughout the present discussion to help illustrate the evaluative steps solved to infer the system specifications of a PV system. Empirical results for this PV installation will now be discussed.

The PV system is partially shaded by an east roof surface in the morning and is substantially shaded by a tree in the west in the afternoon in the spring, fall, and winter, as the sun is lower in the sky during these seasons. Net load data with hourly time-resolution for the site was obtained for five years from 2015 through 2019. In addition, measured PV production data with hourly time-resolution for the corresponding five years was also obtained for purposes of validation. The PV system specifications inferred using net load data applied to the approach discussed herein are shown in Table 2. The approach infers azimuth and tilt values to the nearest 5°.

TABLE 2

| Year | Azimuth | Tilt | STC DC Rating |
|---|---|---|---|
| 2015 | 175 | 25 | 5.15 |
| 2016 | 170 | 15 | 5.11 |
| 2017 | 170 | 25 | 5.05 |
| 2018 | 175 | 20 | 5.05 |
| 2019 | 170 | 20 | 4.98 |

Next, the inferred specifications were used to simulate hourly PV production using the SolarAnywhere® service, cited infra. The simulated production was compared to the measured production for the site. The accuracy between the measured production $P_{measured}(t)$ and simulated production $P_{simulated}(t)$ over time t was quantified using the relative mean absolute error (rMAE), per Equation (5):

$$rMAE = \frac{\sum |P_{measured}(t) - P_{simulated}(t)|}{\sum P_{measured}(t)} \forall\, t \qquad (5)$$

Figure 17:
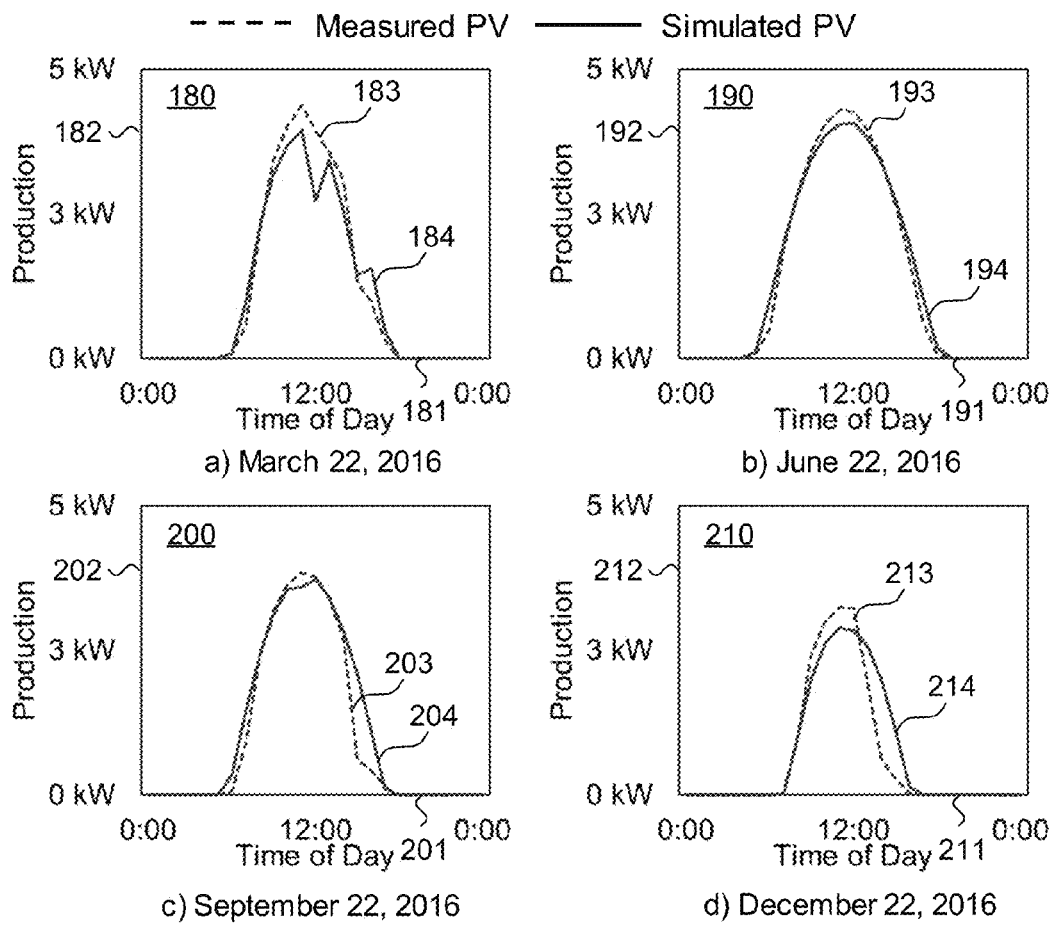
FIG. 17 is a set of graphs showing, by way of example, hourly PV production of selected days in 2016 for the location in Napa, CA.

FIG. 17 is a set of graphs 180, 190, 200, 210 showing, by way of example, hourly PV production of selected days in 2016 for the location in Napa, CA. The x-axes 181, 191, 201, 211 respectively represent time of day. The y-axes 182, 192, 202, 212 respectively represent PV production in kilowatts (KW). The four graphs respectively show the hourly measured PV production (dotted line) 183, 193, 203, 213 and simulated PV production (solid line) 184, 194, 204, 214 for four days in the spring, summer, fall, and winter seasons. The rMAE calculated using Equation (5) for the four days are 15.4%, 7.7%, 14.6%, and 29.0%, respectively. Simulated production during the summer season has higher accuracy compared to days in other seasons, likely due to lower shading losses during the summer season compared to days in the spring, fall, and winter seasons.

Figure 18:
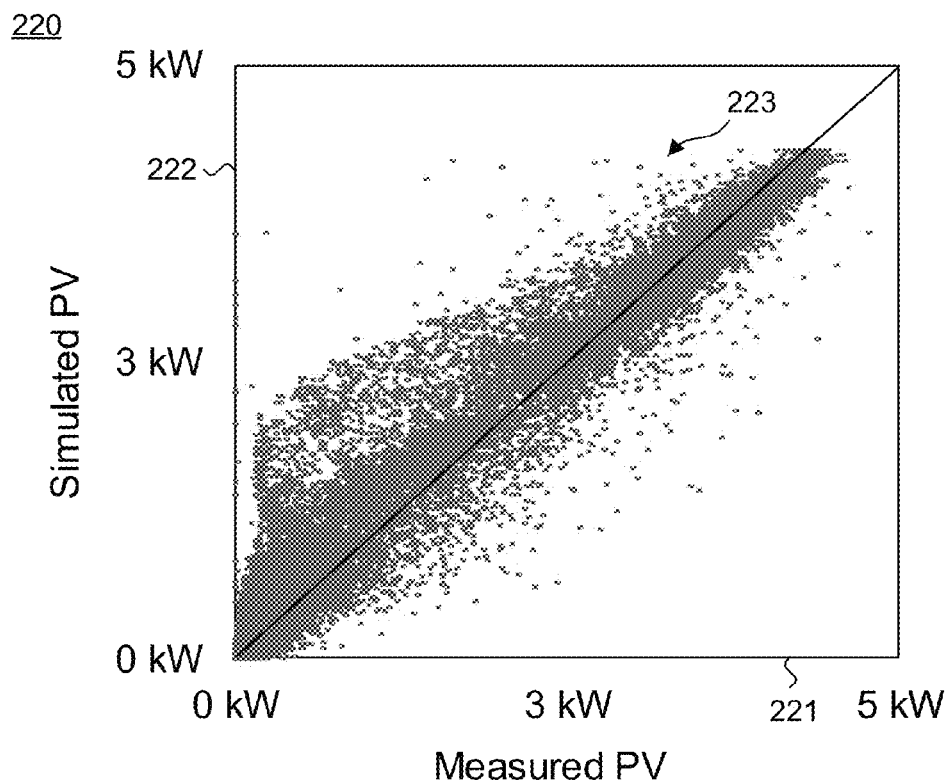
FIG. 18 is a graph showing, by way of example, hourly PV production from 2015 to 2019 for the location in Napa, CA.

FIG. 18 is a graph 220 showing, by way of example, hourly PV production 223 from 2015 to 2019 for the location in Napa, CA. The x-axis 221 represents hourly measured PV production in kW. The y-axis 222 represents simulated PV production in kW. Hourly PV production was simulated for all five years from 2015 to 2019 using PV system specifications inferred following the approach discussed infra beginning with reference to FIG. 1. The simulated hourly PV production was then compared to the corresponding measured production. The square root of the Mean Absolute Error (rMAE) for the five years is 14%. For the individual years from 2015 to 2019, the rMAE's are 14%, 13%, 14%, 15%, and 14%, respectively.

Figure 19:
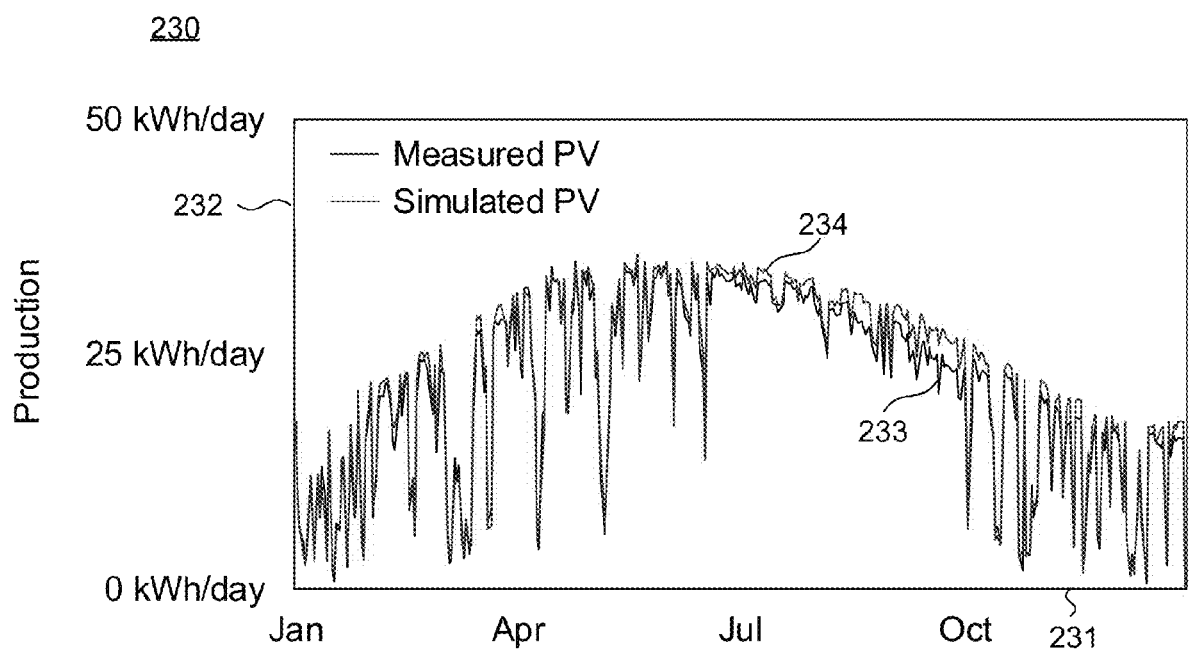
FIG. 19 is a graph showing, by way of example, daily measured PV production and daily simulated PV production for 2016 for the location in Napa, CA.

FIG. 19 is a graph 230 showing, by way of example, daily measured PV production 233 and daily simulated PV production 234 for 2016 for the location in Napa, CA. The x-axis 231 represents the day of the year. The y-axis 222 represents PV production in kWh per day. Hourly production was aggregated on a daily (24-hour) basis. When evaluated for years from 2015 to 2019, the daily rMAE's are 11%, 6%, 10%, 10%, and 8%, respectively. This daily production graph shows that simulated production is generally higher than the corresponding measured production during the spring, fall, and winter seasons. Consideration of losses from nearby shading obstructions during these seasons would possibly reduce this problem.

Implementation

Electric utilities require visibility into the PV installations within their territories and, as a consequence, they will ordinarily request PV system specifications from consumers as a prerequisite to approving the installation of a PV system. A complete PV system specification typically will include geographic location, by latitude and longitude, PV array and inverter sizes and ratings, tilt and azimuth angles, obstruction profile (elevation angles in multiple azimuth directions), and other factors relevant to the PV system and its ability to generate electricity. Consumer-provided PV system specifications, though, can vary in terms of completeness, quality and correctness and may therefore be unusable or usable only with a healthy margin of error when included in the calculations required to produce a forecast of expected energy load.

Figure 20:
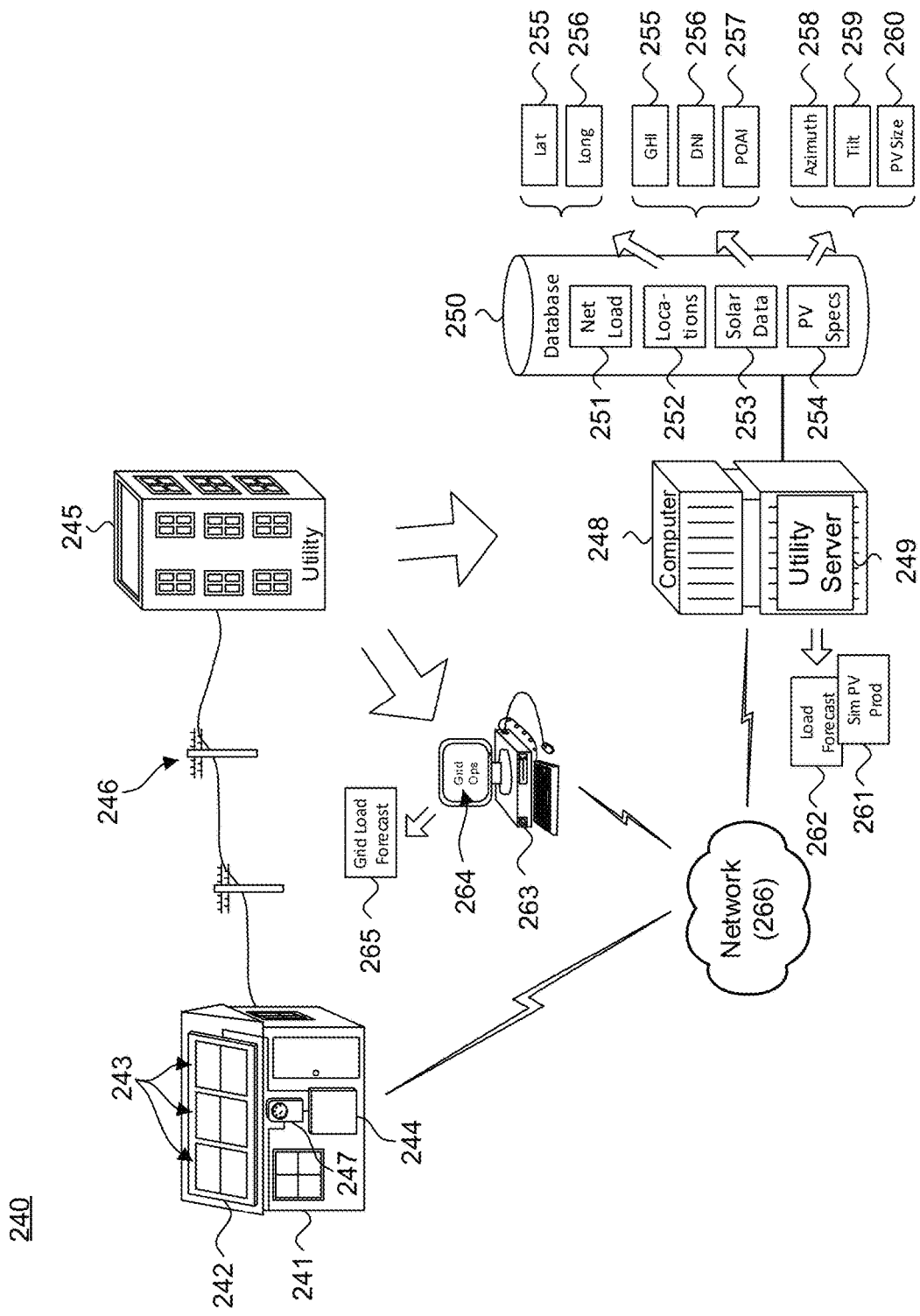
FIG. 20 is a block diagram showing a computer-implemented system for inferring photovoltaic system specifications with the aid of a digital computer in accordance with one embodiment.

Rather than relying on possibly suspect PV system specifications, a utility can instead use only the most trustworthy data available, which would be the location of each connected PV system and the net load data regularly recorded by and collected from its NEM meters. FIG. 20 is a block diagram showing a computer-implemented system 240 for inferring photovoltaic system specifications 254 with the aid of a digital computer 248 in accordance with one embodiment. The computer 248 includes hardware components conventionally found in a general-purpose programmable computing device, such as a central processing unit, memory, user interfacing means, such as a keyboard, mouse, and display, input/output ports, network interface, and non-volatile storage, and execute software programs structured into routines, functions, and modules for execution on the various systems. In addition, other configurations of computational resources, whether provided as a dedicated standalone computer system or arranged in client-server or peer-to-peer topologies, and including unitary or distributed processing, communications, storage, and user interfacing, are possible.

A power utility 245 provides electricity over a distribution grid 246 to individual consumers 241, including residential, commercial, private, public, governmental, and other consumers. A NEM meter 247 is installed at each consumer 241 that has a PV system 242 installed. This discussion is also applicable where two (or more) meters have been installed to measure net consumed electricity, total PV-produced electricity, or other data, although only the first value, net load, would be needed by the utility 245 to estimate total PV production. Each PV system 242 includes an array of PV panels 243 or modules coupled to an inverter 244 that converts direct current to alternating current. Other components working as a part of or in tandem with the PV system 242, such as batteries (not shown) to store electricity from the solar panels, are possible.

Each NEM meter 247 reports net load data 251 to the utility 245. The net load data 245 combines the electricity supplied by the utility 245 to the consumer 241 with any excess PV production back-fed to the power distribution grid 246 from the PV system 242. The utility 245 operates a utility server 249 on the server computer 248 and, optionally, a standalone computer 263 for managing grid operations 264. The server computer 248 could be used by the utility 245 to infer PV system specifications. Alternatively, a third party (not shown) could infer the PV system specifications 254 for the utility 245, and would thereafter provide the inferred PV system specifications 254 to the utility 245 for upload and inclusion in the utility's database 250. Any combination of one or more computers can be used by or collaboratively with the utility's computers 248, 263 for PV system specification inferencing, load forecasting and power distribution grid operations. Other topologies of computational resources are possible.

The net load data 251 is stored by the utility 245 into a database 250 maintained in a storage coupled to the utility server 249. The utility server 249 is remotely interconnected to the NEM meter 247 over a network 266, which can be a wired, wireless or combination data communications network. Alternatively, the net load data 251 can be manually collected from each NEM meter 247 and input into the database 250. The database 250 also stores the locations 252 of the consumers' sites that have installed net metered PV systems 242. Each location 252 is represented by the site's latitude 255 ("Lat") and longitude 256 ("Long"), although other locational representations, such as GPS coordinates, could be used. The locations 252 and the net load data 251 can be considered to be the most trustworthy information available to the utility 245 regarding each consumer PV system 242, as these two sources of information originate from within the utility 245 and can, if required, be corroborated as accurate.

The computer system 254 executes the methodology described infra beginning with reference to FIG. 1 and as further detailed herein. Solar data 253 is obtained for the location 252 of each PV system 242, such as the SolarAnywhere® service, cited infra, or other similar source, based on the PV system's latitude and longitude. The solar data 253 includes GHI 257 and direct normal irradiance (DNI) 258, from which the computer 248 can produce POAI 259 for various azimuth and tilt combinations. Based on the results, specifications 254 for each PV system 242 ("PV Specs") are inferred and saved into the database 250 by the utility server 249. The inferred PV system specifications include azimuth 258, tilt 259 and system size (or rating) 260. Other PV system specifications are possible.

Figure 21:
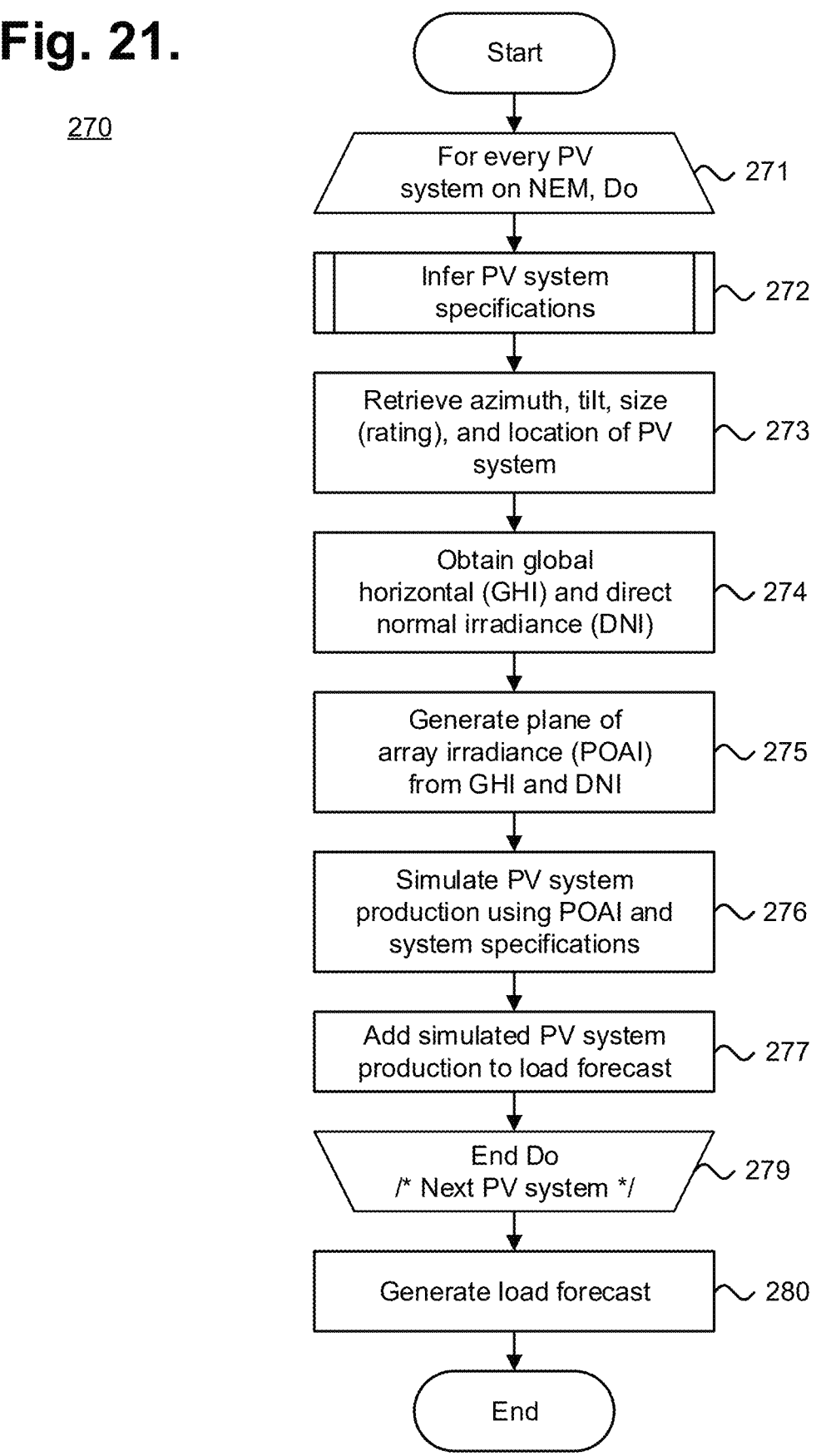
FIG. 21 is a flow diagram showing a method for generating a load forecast based on inferred photovoltaic system specifications with the aid of a digital computer in accordance with a further embodiment.

In a further embodiment, the inferred PV system specifications 254 can be used by the computer 248 to generate a load forecast 262. FIG. 21 is a flow diagram showing a method 270 for generating a load forecast based on inferred photovoltaic system specifications with the aid of a digital computer in accordance with a further embodiment. The simulated total PV production of each PV system 242 on net metering is determined (step 271) as follows. First, the system specifications for the PV system 242 are inferred (step 272), as discussed in detail infra beginning with reference to FIG. 1. The azimuth 258, tilt 259, and system size (or rating) 260 and the location 252 of the PV system 242 are retrieved from the database 250 (step 273). GHI 255 and DNI 256 are obtained for the location 252 of each PV system 242, such as the SolarAnywhere® service, cited infra, or other similar source, based on the PV system's location 252 (step 274). POAI is generated (step 275) based on the GHI 257 and DNI 258 and is used with the inferred specifications to simulate total hourly PV production 263 ("Sim PV Prod") using the SolarAnywhere® service, cited infra (step 276). The simulated total PV production 263 of the PV system 242 is added to the load forecast 264 (step 277). The foregoing steps are repeated (step 279) for each of the remaining PV systems 242 on NEM metering. Finally, a load forecast is generated (step 280) by combining the total simulated PV production 263 with other load estimates.

In a further embodiment, the computer 248 for performing grid operations 264 incorporates the results provided through the methodology described infra beginning with reference to FIG. 1 for inferring PV system specifications with other power estimation and power distribution grid forecasting, planning, estimation, and maintenance methodologies to generate a grid load forecast 265, or other results as may be applicable to utility, power distribution grid or PV fleet planning, operations and management. For instance, the inferred PV system specifications 254 can be used in combination with a fleet load forecast, such as described in commonly-assigned U.S. Pat. Nos. 8,165,811, 8,165,812 and 8,165,813, all issued to Hoff on Apr. 24, 2012; U.S. Pat. Nos. 8,326,535 and 8,326,536, both issued to Hoff on Dec. 4, 2012; and U.S. Pat. No. 8,335,649, issued to Hoff on Dec. 18, 2012, the disclosures of which are incorporated herein by reference.

The inferred PV system specifications 254 can also be used in combination with methodologies for correlating satellite imagery through bounded area variance as used in photovoltaic fleet output estimation, such as described in commonly-assigned U.S. Pat. No. 9,411,073, issued to Hoff on Aug. 9, 2016; U.S. Pat. No. 9,645,180, issued to Hoff on May 9, 2017; U.S. Pat. No. 9,638,831, issued to Hoff on May 2, 2017; U.S. Pat. No. 10,309,994, issued to Hoff on Jun. 4, 2019; U.S. Pat. No. 10,663,500, issued to Hoff on May 26, 2020; U.S. Pat. No. 11,016,130, issued to Hoff on May 25, 2021; U.S. Pat. No. 10,197,705, issued to Hoff on Feb. 5, 2019; U.S. Pat. No. 10,627,544, issued to Hoff on Apr. 21, 2021; and U.S. Pat. No. 11,333,793, issued to Hoff on May 17, 2022, the disclosures of which are incorporated herein by reference. The inferred PV system specifications 254 can be used in combination with the tuning of photovoltaic power generation plant forecasting, such as described in commonly-assigned U.S. Pat. No. 10,409,925, issued to Hoff on Sep. 10, 2019, the disclosure of which is incorporated herein by reference.

Finally, the inferred PV specifications 254 could further be used in conjunction with complementary methodologies of inferring operational specifications of PV systems, such as described in commonly-assigned U.S. Pat. No. 8,682,585, issued to Hoff on Mar. 25, 2014; U.S. Pat. No. 9,740,803, issued to Hoff on Aug. 22, 2017; U.S. Pat. No. 10,140,401, issued to Hoff on Nov. 27, 2018; U.S. Pat. No. 10,803,212, issued to Hoff on Oct. 13, 2020; and U.S. Pat. No. 11,238,193, issued to Hoff on Feb. 1, 2022; U.S. Pat. No. 8,577,612, issued to Hoff on Nov. 5, 2013; U.S. Pat. No. 9,285,505, issued to Hoff on Mar. 15, 2016; U.S. Pat. No. 10,436,942, issued to Hoff on Oct. 8, 2019; U.S. Pat. No. 9,880,230, issued to Hoff on Jan. 30, 2018; U.S. Pat. No. 10,651,788, issued to Hoff on May 12, 2020; and U.S. Pat. No. 10,797,639, issued to Hoff on Oct. 6, 2020, the disclosures of which are incorporated herein by reference. The inferred PV specifications 254 could also be used in conjunction with complementary methodologies of forecasting PV power generation system degradation, such as described in commonly-assigned U.S. Pat. Nos. 10,599,747, issued to Hoff on Mar. 24, 2020 and U.S. Pat. No. 11,068,563, issued to Hoff on Jul. 7, 2021, the disclosures of which are incorporated herein by reference.

While the invention has been particularly shown and described as referenced to the embodiments thereof, those skilled in the art will understand that the foregoing and other changes in form and detail may be made therein without departing from the spirit and scope of the invention.

What is claimed is:

1. A method for inferring photovoltaic (PV) system specifications with the aid of a digital computer, comprising the steps of:
retrieving a location of a consumer site at which a PV system has been installed and connected to a power grid operated by a utility, and net load data recorded through net metering of the consumer site by the utility;
dividing a time frame under consideration into discrete periods and, for each of the discrete periods, performing the steps:
finding a time of peak PV production for the location and a magnitude of minimum net load for the PV system for a representative day; and
estimating a set of base loads for the consumer site, each estimated base load representing a minimal amount of energy consumed;
producing plane-of-array irradiance (POAI) using clear sky global horizontal irradiance (GHI) for the location for a plurality of azimuth and tilt combinations for the PV system for each of the representative days; and
inferring system specifications for the PV system, comprising performing the steps of:
creating a set of azimuth, tilt, and system rating combinations for the PV system based on the magnitude of minimum net load and the base load over each discrete period; and
finding a lowest error metric among the set of azimuth, tilt, and system rating combinations comprising minimizing combined residual errors in the time of peak PV production and the time of maximum POAI and residual errors in the magnitude of minimum net load plus the base load and the magnitude of maximum POAI, the inferred system specifications comprising the azimuth, tilt, and system rating combination associated with the lowest error metric,
wherein the power grid is operated by the utility based on total PV power production of the PV system as simulated using the inferred system specifications over the time frame.

2. The method in accordance with claim 1, the step of finding time of peak PV production and a magnitude of minimum net load for a representative day further comprising the steps of:
identifying clear sky days falling within the discrete period using a deviation test;
removing cloudy and overcast days from the identified clear sky days;
identifying clear sky hours within the remaining identified clear sky days;
estimating an exact solar time of peak PV production using the clear sky hours within the remaining identified clear sky days, the exact solar time of peak PV production corresponding to the time of peak PV production; and
extracting the magnitude of minimum net load and the time of peak PV production from the set of representative days.

3. The method in accordance with claim 2, the step of identifying clear sky days falling within the discrete period further comprising the steps of:
producing GHI at an hourly time resolution based on the location;
setting a deviation range and identifying clear sky days comprising those days whose exact peak solar times do not deviate from solar noon beyond the deviation range; and
performing linear interpolation for each of the clear sky days identified to estimate the exact solar time of peak GHI.

4. The method in accordance with claim 3, the step of performing linear interpolation further comprising the steps of:
selecting a time interval for the GHI;
determining a derivative value estimated before the peak GHI by taking a first derivative of the peak GHI value and GHI value one time interval before the peak GHI;
determining a derivative value estimated after the peak GHI by taking a first derivative of the GHI value one time interval after the peak GHI and the peak GHI value;
forming a straight-line equation between the first derivative value estimated before the peak GHI and the first derivative value estimated after the peak GHI; and
estimating the exact solar time of peak GHI by locating a time when the straight-line equation crosses zero along a plot of deviation from standard noon and GHI.

5. The method in accordance with claim 4, wherein the first derivative value estimated before the peak GHI and the first derivative value estimated after the peak GHI are respectively determined based on:

$$(-0.5, \Delta GHI_{-0.5})$$

$$(0.5, \Delta GHI_{0.5})$$

where the (x, y) pair represents time of first derivative and the first derivative, respectively.

6. The method in accordance with claim 1, the step of removing cloudy and overcast days from the identified clear sky days further comprising the steps of:
choosing each of the identified clear sky days that did not deviate from solar noon beyond the deviation range;
reusing the straight line equation between the first derivative value before peak GHI and first derivative value after peak GHI;
removing each chosen clear sky day from the identified clear sky days failing a slope test; and
removing those clear sky days from the identified clear sky days failing an overcast test.

7. The method in accordance with claim 6, the step of removing each chosen clear sky day from the identified clear sky days failing a slope test further comprising the steps of:
evaluating a median slope for the first derivative straight-line equation as solved for each of the clear sky days in each discrete period throughout the time frame under consideration; and
removing each chosen clear sky day from the identified clear sky days whose slope of the result of the first derivative straight-line equation exceeds the median slope of the clear sky days in each discrete period.

8. The method in accordance with claim 6, the step of removing those clear sky days from the identified clear sky days failing an overcast test further comprising the steps of:
setting a threshold of peak GHI;
estimating peak GHI for each of the chosen clear sky days that were not removed; and
removing those clear sky days from the identified clear sky days exceeding a peak GHI threshold by evaluating an overcast test.

9. The method in accordance with claim 2, the step of estimating the exact solar time of peak PV production further comprising the steps of:

setting a threshold of minimum net load;
removing each day whose net load falls below the threshold of minimum net load;
identifying each day whose net load contains loads other than PV production and baseload, and removing that day; and
cross referencing the remaining days that have not been removed from the net load data with the clear sky days identified from the GHI data as falling within the same discrete period using the deviation test and the slope and overcast tests not removed from the identified clear sky days.

10. The method in accordance with claim 2, the step of extracting the magnitude of minimum net load and the time of peak PV production further comprising the steps of:
selecting a median time from among all times of minimum net load for the discrete period;
for the day corresponding to each selected median time, extracting the magnitude of minimum net load and the time of peak PV production, and adding the day to the set of representative days.

11. The method in accordance with claim 1, the step of inferring system specifications for the PV system further comprising the steps of:
selecting a system rating for the PV system for each azimuth and tilt combination;
creating a time-magnitude-based error metric based on the time-error in time of peak PV production and time of maximum POAI and the magnitude-error in magnitude of minimum net load plus base load and magnitude of maximum POAI; and
finding the minimum time-magnitude-based error metric to find the inferred system specifications.

12. The method in accordance with claim 11, the step of selecting a system rating for the PV system for each azimuth and tilt combination further comprising the steps of:
taking the sum of the magnitude of minimum net load and base load for the each of the discrete periods; and
minimizing the error between the sum and the magnitude of maximum POAI values over the day for the discrete period times the PV system rating for all days in the discrete period, where the minimum error corresponds to the system rating for the PV system.

13. The method in accordance with claim 12, wherein the error between the sum and the POAI values over the day for the discrete period times the PV system rating for all days in the discrete period is determined based on:

$$\min \Sigma((|\min(D_x)|+B_x)-(rtg_i*|\max(DI_x)|))\forall D, \forall C$$

where $D_x$ is the net load data for the representative day in discrete period x, $B_x$ is baseload for the representative day in discrete period x, $rtg_i$ is system rating for $i^{th}$ azimuth and tilt combination, and $DI_x$ is POAI data for the representative day in discrete period x.

14. The method in accordance with claim 11, the step of creating a time-magnitude-based error metric further comprising the steps of:
subtracting the time of peak PV production and time-of-day of maximum POAI for each representative day and for all azimuth, tilt, and rating combinations to find the time-error in time of peak PV production;
subtracting the magnitude of minimum net load plus the baseload for each of the discrete periods and the magnitude of maximum POAI for all azimuth, tilt, and rating combinations to find the magnitude-error in magnitude of minimum net load plus base load and maximum POAI; and
combining the error in time of peak PV production and the error in magnitude of minimum net load plus base load and maximum POAI to form a time-magnitude-based error metric.

15. A system for inferring photovoltaic (PV) system specifications with the aid of a digital computer, comprising:
a database storing a location of a consumer site at which a PV system has been installed and connected to a power grid operated by a utility, and net load data recorded through net metering of the consumer site by the utility; and
a computer interfaced to the database and comprising a processor coupled to a memory and executing program instructions maintained in the memory, the program instructions comprising code operable to perform the steps of:
dividing a time frame under consideration into discrete periods and, for each of the discrete periods, performing the steps:
finding a time of peak PV production for the location and a magnitude of minimum net load for the PV system for a representative day; and
estimating a set of base loads for the consumer site, each estimated base load representing a minimal amount of energy consumed;
producing plane-of-array irradiance (POAI) using clear sky global horizontal irradiance (GHI) for the location for a plurality of azimuth and tilt combinations for the PV system for each of the representative days; and
inferring system specifications for the PV system, comprising performing the steps of:
creating a set of azimuth, tilt and system rating combinations for the PV system based on the magnitude of minimum net load and the base load over each discrete period; and
finding a lowest error metric among the set of azimuth, tilt and system rating combinations comprising minimizing combined residual errors in the time of peak PV production and time of maximum POAI and residual errors in the magnitude of minimum net load plus the base load and a maximum of the POAI, the inferred system specifications comprising the azimuth, tilt and system rating combination associated with the lowest error metric,
wherein the power grid is operated by the utility based on total PV power production of the PV system as simulated using the inferred system specifications over the time frame.

16. The system in accordance with claim 15, the program instructions comprising code operable to perform the step of finding a representative day further comprising the steps of:
identifying clear sky days falling within the discrete period using a deviation test;
removing cloudy and overcast days from the identified clear sky days;
identifying clear sky hours within the remaining identified clear sky days;
estimating an exact solar time of peak PV production using the clear sky hours within the remaining identified clear sky days, the exact solar time of peak PV production corresponding to a time of peak PV production; and
extracting the magnitude of minimum net load and the time of peak PV production from the set of representative days.

17. The system in accordance with claim 16, the program instructions comprising code operable to perform the step of identifying clear sky days falling within the discrete period further comprising the steps of:

producing GHI at an hourly time resolution based on the location;

setting a deviation range and identifying clear sky days comprising those days whose exact peak solar times do not deviate from solar noon beyond the deviation range; and performing linear interpolation for each of the clear sky days identified to estimate the exact solar time of peak GHI.

18. The system in accordance with claim 15, the program instructions comprising code operable to perform the step of removing cloudy and overcast days from the identified clear sky days further comprising the steps of:

choosing each of the identified clear sky days that did not deviate from solar noon beyond the deviation range;

reusing the straight line equation between the first derivative value before peak GHI and first derivative value after peak GHI;

removing each chosen clear sky day from the identified clear sky days failing a slope test; and removing those clear sky days from the identified clear sky days failing an overcast test.

19. The system in accordance with claim 18, the program instructions comprising code operable to perform the step of removing each chosen clear sky day from the identified clear sky days failing a slope test further comprising the steps of:

evaluating a median slope for the first derivative straight-line equation as solved for each of the clear sky days in each discrete period throughout the time frame under consideration; and removing each chosen clear sky day from the identified clear sky days whose slope of the result of the first derivative straight-line equation exceeds the median slope of the clear sky days in each discrete period.

20. The system in accordance with claim 18, the program instructions comprising code operable to perform the step of removing those clear sky days from the identified clear sky days failing an overcast test further comprising the steps of:

setting a threshold of peak GHI;

estimating peak GHI for each of the chosen clear sky days that were not removed; and removing those clear sky days from the identified clear sky days exceeding a peak GHI threshold by evaluating an overcast test.

21. The system in accordance with claim 15, the program instructions comprising code operable to perform the step of inferring system specifications for the PV system further comprising the steps of:

selecting a system rating for the PV system for each azimuth and tilt combination;

creating a time-magnitude-based error metric based on the time-error in time of peak PV production and time of maximum POAI and the magnitude-error in magnitude of minimum net load plus base load and magnitude of maximum POAI; and finding the minimum time-magnitude-based error metric to find the inferred system specifications.

* * * * *